United States Patent [19]

Sendrow

[11] 4,317,957
[45] Mar. 2, 1982

[54] SYSTEM FOR AUTHENTICATING USERS AND DEVICES IN ON-LINE TRANSACTION NETWORKS

[76] Inventor: Marvin Sendrow, 4609 Logsdon Dr., Annandale, Va. 22003

[21] Appl. No.: 129,110

[22] Filed: Mar. 10, 1980

[51] Int. Cl.³ .............................................. H04L 9/00
[52] U.S. Cl. ............................ 178/22.08; 340/825.34; 235/379; 235/382
[58] Field of Search .................... 178/22, 22.08, 22.09; 375/2; 235/379, 380, 382; 340/149 A, 149 R

[56] References Cited

U.S. PATENT DOCUMENTS

| | | | |
|---|---|---|---|
| 3,956,615 | 5/1976 | Anderson et al. | 235/379 |
| 3,985,998 | 10/1976 | Crafton | 340/149 A |
| 4,025,760 | 5/1977 | Trenkamp | 340/149 A |
| 4,123,747 | 10/1978 | Lancto et al. | 178/22 |
| 4,214,230 | 7/1980 | Fak | 178/22 |
| 4,223,403 | 9/1980 | Konheim | 178/22 |
| 4,238,854 | 12/1980 | Ehrsam et al | 375/2 |
| 4,259,720 | 3/1981 | Campbell | 375/2 |

*Primary Examiner*—Howard A. Birmiel
*Attorney, Agent, or Firm*—C. Lamont Whitham; Gerald J. Ferguson, Jr.; Joseph J. Baker

[57] ABSTRACT

A method for efficiently protecting transactions and providing authentication of users and devices in on-line systems that transfer funds electronically, dispense cash, or provide a good or permit a service to be utilized is provided. The transaction may be initiated by a magnetic-striped plastic card at an attended or unattended terminal (10, 11, 12) and requires the entry of a preassigned Personal Identification Number through a keyboard (20). The Personal Identification Number is encrypted (23) more than once at the terminal and other means are used in order to prevent the utilization of certain tapped-line data. The data required to validate and authorize the transaction is transmitted securely to a centralized computer (14) which accesses from its stored data base (15) the data that is required to decrypt and validate the transaction, including the encrypted Personal Identification Number corresponding to the received transaction data. A secret Terminal Master Key must be maintained securely at each terminal and may differ at each terminal. A list of such Terminal Master Keys and other secret data must be securely maintained at the centralized computer. Means for multiple-encryptions and decryptions in a predetermined way must also be maintained at each terminal and at the centralized computer. Means (34) are provided for securely returning a response to the terminal at which the transaction was initiated to authorize or reject the requested transaction. These functions are accomplished in a way that permits efficient utilization of data communications lines and reduces or eliminate perpetration of fraud by any of various means.

17 Claims, 9 Drawing Figures

FIG 7A
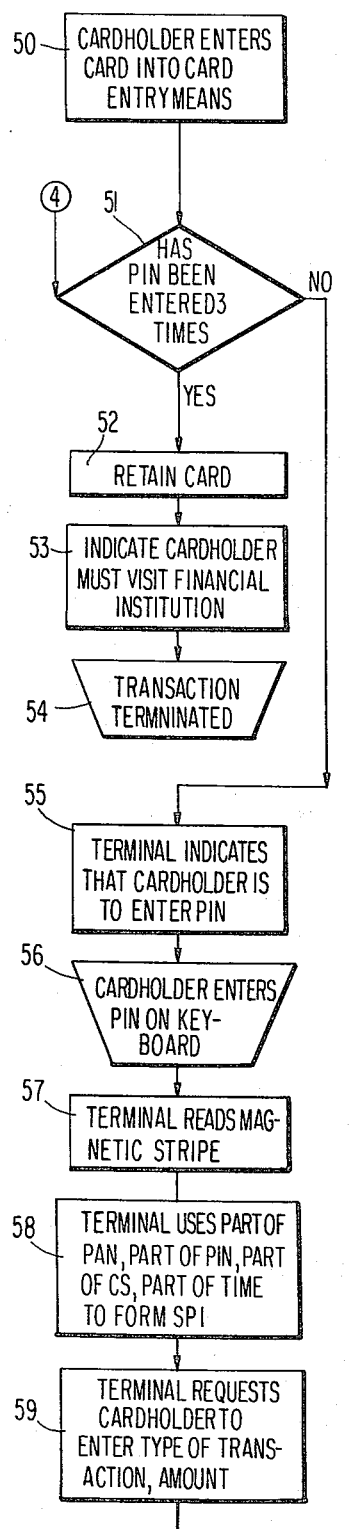
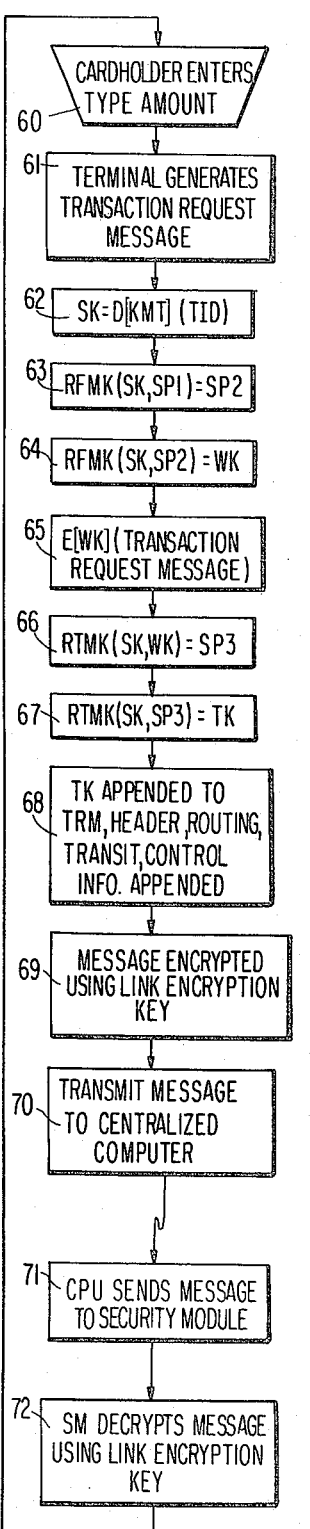
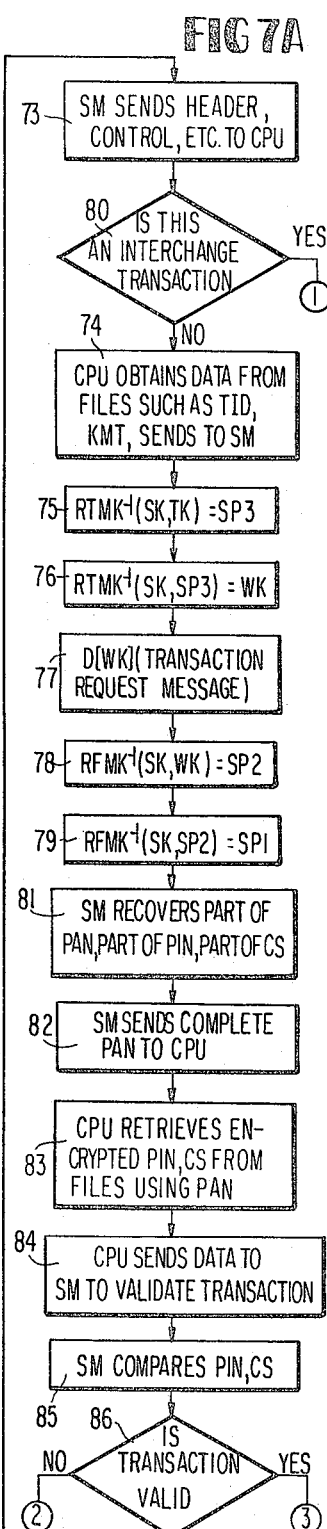

SYSTEM FOR AUTHENTICATING USERS AND DEVICES IN ON-LINE TRANSACTION NETWORKS

BACKGROUND OF INVENTION

1. Field of the Invention

This invention relates to the secure generation and transmission of Transaction Request Messages and Responses in on-line Electronic Funds Transfer and other types of networks consisting of remote terminals in communication with a central data base containing encrypted data used in the validation or authentication process or similar networks used to transfer funds and that provide for, in addition to transferring funds, dispensing cash, paying bills, making deposits, dispensing a good or permitting utilization of a service.

2. History of the Prior Art

Both on-line and off-line computer networks and systems have been developed for executing user initiated or requested financial transactions for reasons of public convenience and economy. One example is a cash dispensing machine. Such a machine may be activated by use of an appropriately coded check or other negotiable instrument, or a plastic credit, debit or identification card, and dispenses the requested amount of cash if the request seems valid to the authenticating means in the cash dispensing device.

One type of on-line system stores account information in a central data base to which the remote terminals are connected by data communication lines. In response to submission of specified information from a remote terminal, such as account number, amount of sale or amount requested, merchant identification if a sale, and secret information related to the cardholder, the system searches the account files to obtain data that may indicate that the transaction should be approved or denied. Such information may include date of last use, amount of credit if a credit transaction, balance in account, whether a card has been lost, stolen or has expired. If the transaction is approved, the system adjusts the account information appropriately after the transaction is completed. As the art progressed, terminals with increased functions were provided that permitted more functions to be performed than dispensing cash or effecting a purchase. For instance, financial institutions, to reduce peak loads and to extend their services during times of business closure, permit the transfer of funds between accounts, accept payments for utilities or for loan balances, accept deposits, and provide for advances to be charged to valid credit cards. These devices typically include a plastic card reading mechanism, a keyboard, a display, document entry and exit apertures and may be connected to a data base or operate as a stand-alone device. Due to the increased functions permitted, the exposure to fraud increased, so that secret numbers (Personal Identification Numbers) were issued to cardholders to reduce the exposure. The Personal Identification Number entered on the keyboard by the cardholder must either compare directly with the number encoded on the magnetic stripe of the plastic card or some correspondence, that may depend on encryption, must exist between the Personal Identification Number and the number encoded on the magnetic stripe. Otherwise, the transaction is not enabled on the presumption that the card was either lost or stolen. This method may be used by stand-alone devices or devices connected to a central data base.

The use of a Personal Identification Number improved the security of such systems but still left some means available for fraud and had other disadvantages. The problem of secure issue of Personal Identification Numbers arose. The use of on-line files with lists of Personal Identification Numbers may permit unauthorized access to the files by employes for purpose of obtaining what is supposed to be secret information. With such information, duplicate or counterfeit cards can easily be manufactured to perpetrate fraud. Several different approaches were taken to overcome the disadvantages. One approach, to avoid the use of on-line files and to overcome the supposed cost and complexity of on-line systems, was to try to improve the security of stand-alone use. As a result, special plastic cards with material laminated into the card, pasted onto the card, holes punched into or onto the card as a security measure, were devised, none of which was effective by itself.

Another approach was to encrypt the Personal Identification Number stored in the account records, which is effective, provided appropriate additional security measures are instituted. Encryption may not be effective with stand-alone devices because of access required by maintenance personnel and for replenishing the cash supply or other servicing, thereby exposing the encryption key to simple means of compromise. Encrypting only the secret information in the central account records is not effective since the secret information must also be entered at a remote terminal to initiate a transaction and be transmitted, usually by means of utility communication lines, to the centralized computer, thereby becoming subject to monitoring by person or persons unknown. The transmission therefore must also be encrypted, which is effective but may still permit someone who can break the code access to the list of correspondence between account information and Personal Indentification Numbers by monitoring these transmissions. An additional shortcoming is the generation, by a sophisticated penetrator, of spurious transactions to fraudulently transfer funds within data base accounts. As a result, the previous methods of validating the secret number at a centralized data processor provide protection against casual fraud but may not provide adequate protection against a penetrator having knowledge of, and perhaps, access to, current data processing equipment or systems. Alternatively, those methods that seem to provide an adequate level of security also seem quite costly due to the need for utilizing high-cost data communication lines for multiple transmissions for validation of each transaction and for transmission in a secure way of the required enciphering keys, rather than relying on a single Transaction Request Message, a single Response and an acknowledgement or some minimum number of transmissions per transactions.

There has evolved within the same time frame networks other than the proprietary networks that a single financial institution may deploy to service its customers. Financial Institutions may decide to share networks or to interchange transactions in order to provide better service. There are national networks developed by Bank Cards to service many financial institutions that may aggregate millions of accounts and millions of transactions per day. Although each transaction may be small, the aggregate dollar volume transferred per day is substantial. In addition, there are the semi-official clearing house systems and the networks used by Federal Financial Agencies to transfer billions of dollars of funds daily and that impact the financial structure of the country. The methods used by some of the large financial institution networks to provide security are so simplistic, they may easily be defeated by a knowledgeable person, as occasional newspaper headlines attest.

What has been lacking until now is a procedure, method or system that integrates the validation and authentication of the plastic card, cardholder, terminal or other device used to initiate transactions, render ineffective wiretap data, that does not require unencrypted Personal Identification Numbers to be processed, that efficiently uses costly data communication lines by minimizing transmissions and is adaptable to the requirements of different types of on-line networks.

SUMMARY OF INVENTION

A system in accordance with the present invention consists of a means for multiply-enciphering secret and other data in a predetermined way at a remote terminal or a computer connected by communication lines to a computer, said enciphering to provide authentication of the card, cardholder, terminal or other device, and to provide security against intrusion by wiretapping in a way that maximizes utilization of communication lines. The secret data may be entered on a keyboard by an authorized cardholder together with other data that may be required to complete the transaction. The secret and other data, and data internal to the remote terminal or computer, are multiply-enciphered in a predetermined way using a secret Terminal Master Key stored in the terminal or computer, initially to generate a Working Key that is used only to encipher the Transaction Request Message that is generated within the terminal or computer by suitable means. The Working Key is then additionally multiply-enciphered in a predetermined way using the secret Terminal Master Key to generate a Transmitted Key that is appended to the Transaction Request Message and transmitted by suitable means to the computer at the centralized account data base in a way that prevents intrusion by wire tapping. At the centralized computer, the account data base is searched to find enciphered and other data corresponding to the account of the authorized cardholder and the device from which the message was received, which data is used two ways. Part of the data is used to facilitate the multiple decipherments of the Transmitted Key in order to obtain the Working Key. Other parts of the data are used to validate and authenticate the transaction after it has been deciphered using the Working Key and the Working Key itself has been further multiply-deciphered and in a way that provides that the enciphered data is protected from access by employees of the financial institution such as programmers, systems analysts, operators and also protected from other sophisticated penetrators who may gain unauthorized access to the computer network or system. After the transaction has been validated, additional tests of an accounting nature may be performed by the central computer to determine whether the Transaction Request should be approved, tests depending upon data such as balance in account, date of last use, amount withdrawn and other data. An appropriate response is generated at the centralized computer by suitable means, which response is enciphered in the same Working Key used to encipher the Transaction Request Message. This Transaction Request Response is transmitted by suitable means to the terminal or computer from which the Transaction Request Message was received, where it is deciphered by suitable means using the Working Key that has been securely stored and the requested transaction is completed if approved, or an indication displayed that the transaction is not approved. After completion of the transaction, the terminal or computer may send an acknowledgement to the centralized computer indicating the type of transaction completed, as an added security measure, which acknowledgement may be enciphered using the same Working Key. After the centralized computer receives the acknowledgement, it updates the accounting data base and then the remote terminal or computer and the centralized computer destroy the Working Key securely by resetting the register or location in which the Working Key has been stored to prevent reuse or compromise.

Because the secret data and other data are used to generate the working key required to encipher each Transaction Request Message, each such Message will be enciphered using a different Working Key before being transmitted to the centralized computer, substantially enhancing the strength of the enciphering means and protecting the Terminal Master Key from compromise by statistical cryptanalysis. In the preferred embodiment, there is only 1 chance in 2 to the 56th power that the same Working Key would be generated twice.

BRIEF DESCRIPTION OF DRAWINGS

A better understanding of the invention may be had from a consideration of the following detailed description considered in conjunction with the accompanying drawings in which:

FIGS. 7A, 7B and 7C are a detailed, operational block diagram of the overall method or process of the present invention.

DETAILED DESCRIPTION OF THE INVENTION

Definitions

Figure 1:
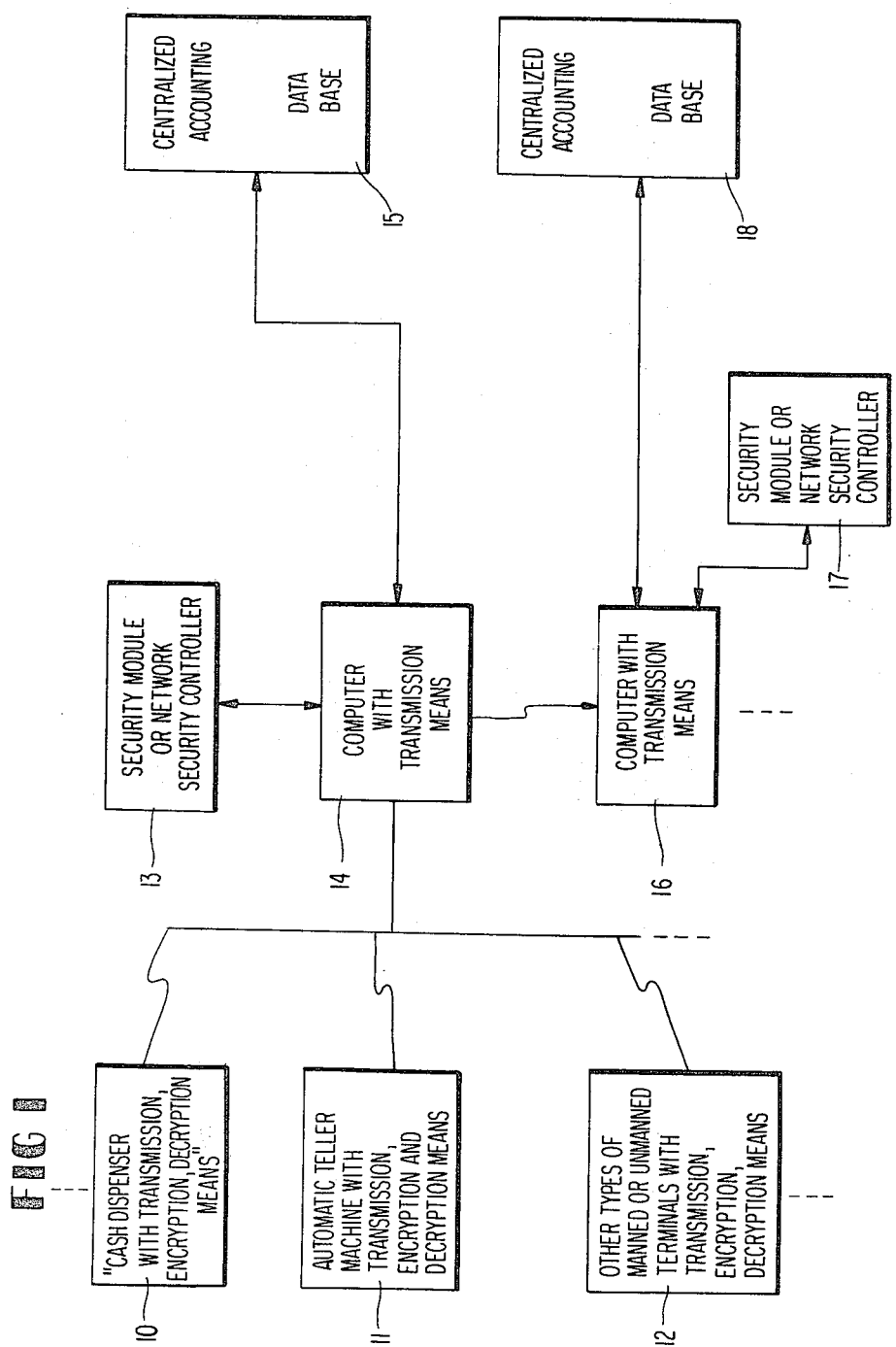
FIG. 1 is a functional block diagram representation of a typical on-line financial network in which the present invention may be implemented.

Terminal: A device such as a Cash Dispenser, Automatic Teller Machine, Point-of-Sale device, or any of various types of computers that may be used to initiate a financial transaction.

Terminal Identification (TID): A designation of 8—8 binary digit numbers, letters or a mixture of numbers and letters that identifies a specific terminal and is embodied as an integral characteristic of the terminal.

Primary Account Number (PAN): A designation that identifies an account holder in an accounting data base.

Personal Identification Number (PIN): A variable number of digits, letters or a mixture of digits and letters known only to an authorized account holder and used in the initiation and validation of on-line financial transactions. In the preferred embodiment, at least 4 characters are used as the Personal Identification Number. The binary designation chosen for these and other parameters may be any of those commonly used in computer processing or data communications without affecting the scope of the invention.

Card anti-counterfeiting features (CS): A designation or identification for a magnetic-striped, plastic, size "A" card that cannot be changed without destroying the card.

Encryption or Decryption Keys: Some embodiments of the Data Encryption Standard require a secret 56 binary digit key to particularize or control the operation of the algorithm, some embodiments require that 64 secret binary digits be entered into the key register even though only 56 enter into the operation of the algorithm and the remaining 8 are odd parity binary digits, one for each 7 binary digits of the key and each parity binary digit located to the right of each 7 binary key digits. Either of these is within the scope of the invention, as are other cryptographic systems which require or permit a secret encryption key to control or particularize the operation of the cryptographic algorithm.

Master Key (KMO if at a centralized computer, KMT if at a terminal): A key used primarily or solely to encrypt and decrypt other keys.

Master Key Variants (KM1 and KM2 if at a centralized computer, KMT1 and KMT2 if at a terminal): A Master Key with certain specified binary digits inverted to provide a defense against specific types of penetration by an intruder. In the 56 binary digit representation, KM1 and KMT1, called the first variants, are equal to the respective Master Keys with binary digits 2, 9, 16, 23, 30, 37, 44, 51, counting left to right, inverted. Then, KM2 and KMT2, called the second variants, are formed from the respective Master Keys by having binary digits 5, 12, 19, 26, 33, 40, 47, 54 inverted.

Working Key (WK): A key used to encrypt or decrypt a Transaction Request Message. In this invention, it differs for each transaction to provide an enhanced degree of security.

Transmitted Key: A key transmitted with a transaction and used to provide a defense against wire tap and used to facilitate decryption.

Encrypt data Y using key X: E[X](Y)
Decrypt data Y using key X: D[X](Y)
Encrypt under Master Key:
E[KMO] (Key) at centralized computer;
E[KMT] (Key) at terminal.
Decrypt under Master Key:
D[KMO] (Key) at a centralized computer;
D[KMT] (Key) at a terminal.
Reencrypt from Master Key (RFMK(X,Y)): Defined as; E[D[KM1](X)](D[KMO](Y)).
Reencrypt to Master Key (RTMK(X,Y)): Defined as: E[KMO](D[D[KM2](X)](Y)).
Inverse Reencrypt from Master Key (RFMK$^{-1}$(X,Z)): Defined as; E[KMO](D[D[KM1](X)](Z)).
Inverse Reencrypt to Master Key (RTMK$^{-1}$(X,W)): Defined as; E[D[KM2](X)](D[KMO](W)).
Concatenation, specified by " || " (Double Bar): Joining of subfields together to form a field by juxtaposing the subfields, for instance AB || CD=ABCD.

Description of the Preferred Embodiment

Figure 2:
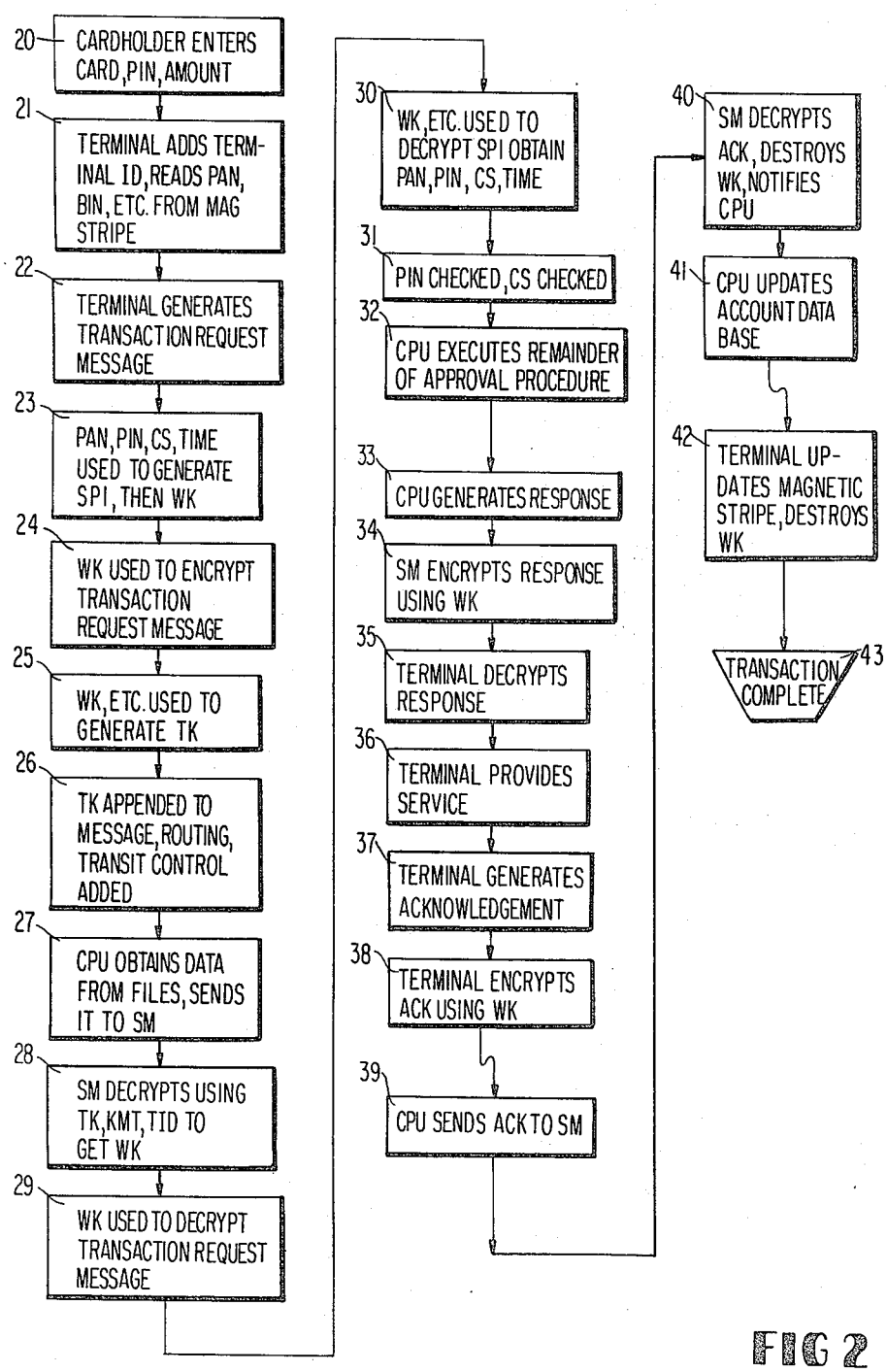
FIG. 2 is an operational block diagram that provides an overview of the system description of the present invention.

Referring now to the drawings, and more particularly to FIGS. 1 and 2, the invention will be described in terms of a preferred embodiment. This embodiment comprises a network having cash dispensing machines, automatic teller machines or the like such as would be used by a bank or similar financial institution. It is to be expressly understood, however, that the invention has broad and general applications including, but not limited to, transferring funds, dispensing a good or permitting the utilization of a service.

A cardholder enters his magnetic striped size "A" plastic card into an attended or unattended financial terminal 10, 11, 12, enters his Personal Identification Number and amount requested or amount of transaction on a keyboard at 20. The terminal reads the magnetic stripe and extracts the Bank Identification Number, the Primary Account Number and adds the Terminal Identification at 21. The terminal generates the Transaction Request Message at 22 and uses the Primary Account Number, the Personal Identification Number, the card anti-counterfeiting feature number and the Time field to generate Security Parameter 1, which is used with the Terminal Identification and the Terminal Master Key within the encryption means to generate the Working Key at 23 in a manner to be explained with reference to FIGS. 7A to 7C. The Working Key is used to encrypt the Transaction Request Message at 24 already generated. The Working Key, the terminal Identification and the Terminal Master Key are used to generate the Transmitted Key at 25 in a manner to be explained with reference to FIGS. 7A to 7C. The Transmitted Key is appended to the Transaction Request Message in addition to transit, routing and other control information that may be required such as an Initialization Vector required to initialize the DES in some usages, and the complete message is transmitted to the centralized computer 14 at 26 by transmission means.

The centralized computer 14 obtains data, some of it encrypted, from the accounting data base 15 using the control information in the message header and other information and sends it all to the Security Module 13 at 27. The Security Module 13 uses the Terminal Identification, the Terminal Master Key and Transmitted Key within the encryption means to obtain the Working Key at 28 in a manner to be described with reference to FIGS. 7A to 7C. The Working Key is used within the Security Module 13 to decrypt the Transaction Request Message at 29. The Security Module 13 uses the Working Key, the Terminal Master Key and the Terminal Identification within the encryption means to obtain Security Parameter 1 in a manner to be explained with reference to FIGS. 7A to 7C in order to obtain access to the Personal Identification Number and card anti-counterfeiting feature number at 30. The Security Module 13 verifies that the Personal Identification Number and card anti-counterfeiting feature number that was generated from the data in the message is the same as those values contained in the accounting data base transferred from the centralized computer by any one of several means at 31, and notifies the centralized computer 14.

Figure 7B:
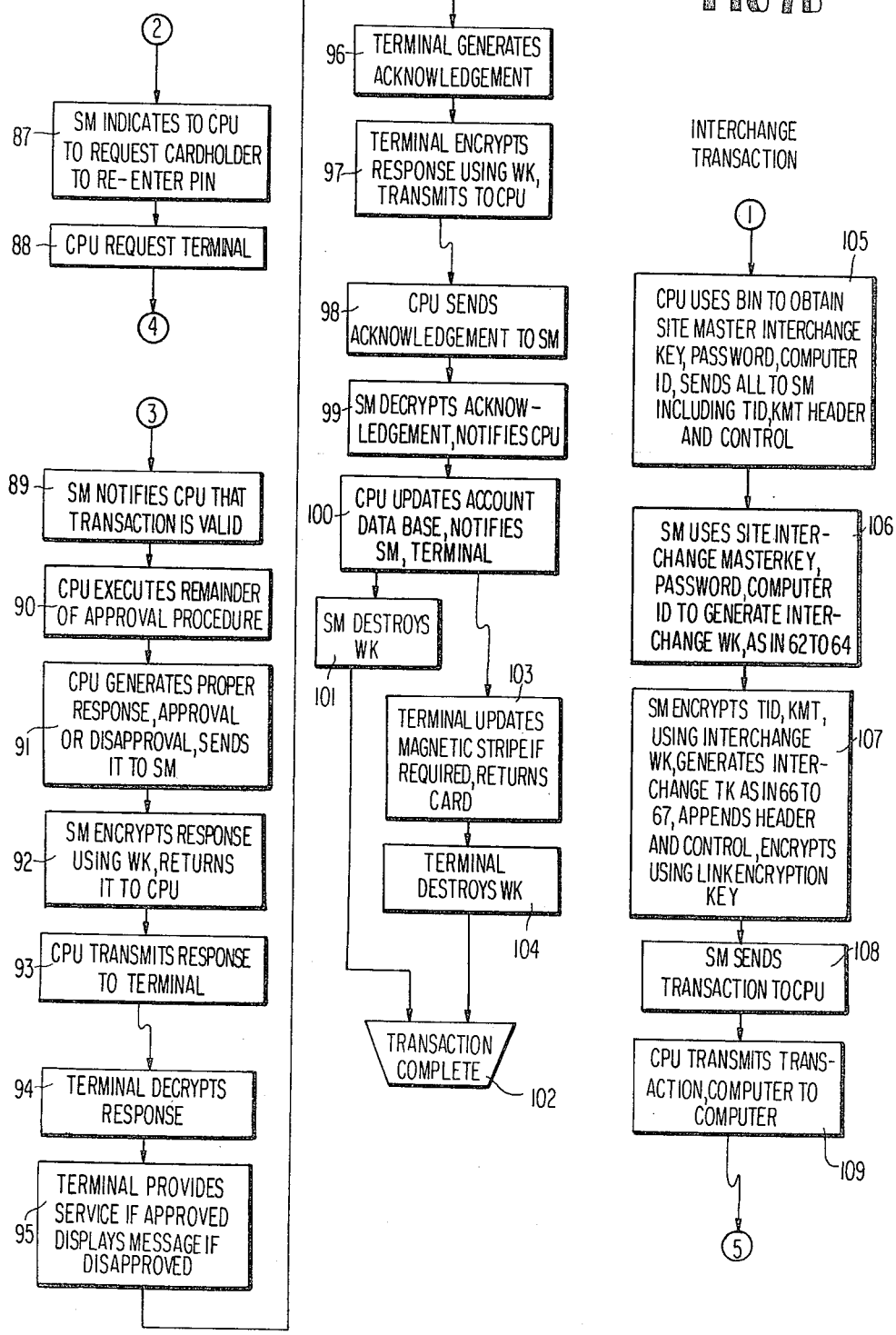
Figure 7C:
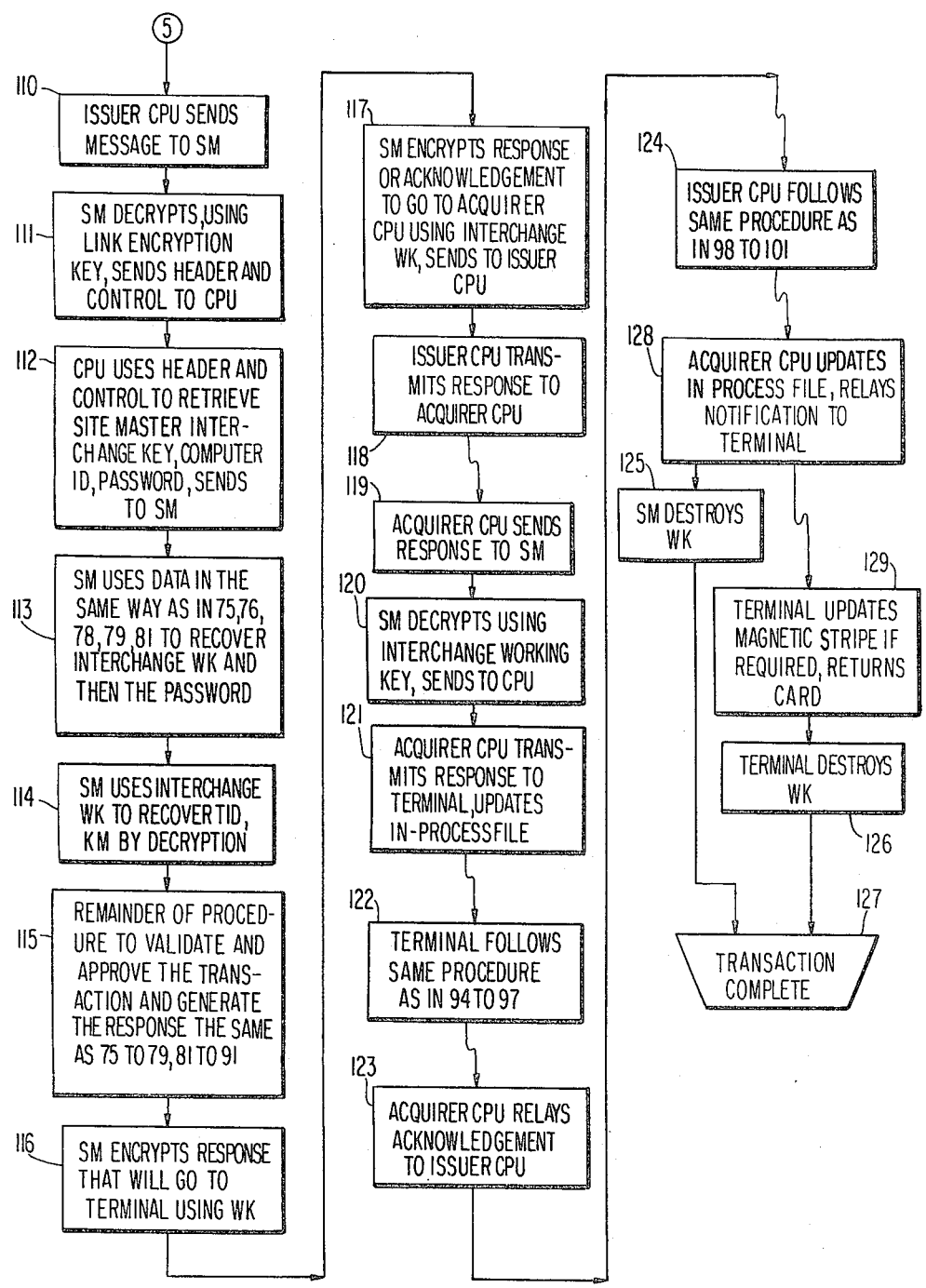

The centralized computer 14 executes the remainder of the approval process at 32, generates and transmits to the Security Module 13 the appropriate response at 33. The Security Module 13 encrypts the response using the Working Key at 34, after which the response is transmitted to the terminal 10, 11 or 12 by transmission means. The terminal decrypts the response using the Working Key at 35, provides the service requested at 36, generates an acknowledgement at 37, encrypts the acknowledgement using the Working Key at 38 and transmits it to the centralized computer 14. The centralized computer 14 sends the acknowledgement to the Security Module 13 at 39. The Security Module 13 decrypts the acknowledgement using the Working Key, notifies the centralized computer 14 and destroys the Working Key at 40. The centralized computer 14 updates the account base 15 at 41, the terminal 10, 11 or 12 updates and writes the magnetic stripe on the plastic card if required, destroys the Working Key at 42, completing the transaction at 43. With reference now to FIGS. 7A to 7C, the present invention may be implemented on a financial transaction or transfer network such as that represented in FIG. 1 that contains attended or unattended terminals 10, 11, 12 or a computer 16 with transmission and encryption means and associated Security Module 17 and data base 18 connected by data communication lines to a centralized computer with transmission means 14, encryption means 13, and with access to a centralized accounting data base 15, which may be any one of several media for storing, retrieving and changing data usually by magnetic or electromagnetic means. The accounting data stores information related to each account assigned to authorized account holders of the Financial Institution. The terminals or computer may be connected to the centralized computer by any of various means familiar to those skilled in the art. In order to initiate a transaction on such a network, an authorized cardholder enters his magnetic striped, size "A" plastic card into a card entry means at the terminal 50 as shown in FIG. 7A, the terminal determines whether the cardholder has been requested to enter his Personal Identification Number more than a fixed number of times at 51, in the preferred embodiment three times. If the cardholder has entered his Personal Identification Number three times, the terminal retains the card at 52, indicates that the cardholder must visit his Financial Institution at 53 and terminates the transaction at 54.

Figure 3:
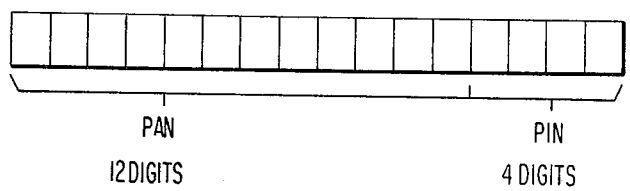
FIG. 3 is a representation of one method of forming Security Parameter 1 at a terminal or computer to initiate the process of the present invention.
Figure 4:
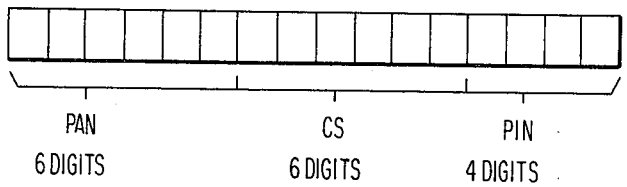
FIGS. 4, 5, 6 are alternative methods of forming Security Parameter 1 to suit the needs or characteristics of different types of financial, on-line networks.
Figure 5:
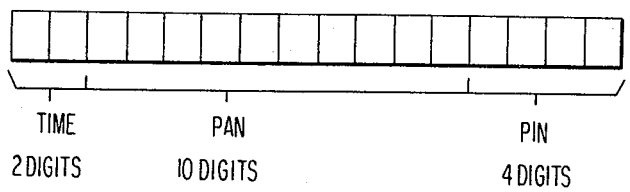
Figure 6:
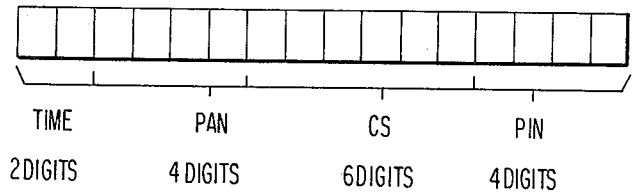

If the cardholder has not entered his Personal Identification Number three times, the terminal requests the cardholder to enter his Personal Identification Number on the keyboard at 55, which the cardholder does at 56, the terminal reads the magnetic stripe at 57, the terminal forms Security Parameter 1 at 58 by using part of the Primary Account Number, part of the Personal Identification Number, part of the card anti-counterfeiting number and part of the Time field as shown in FIG. 6 or alternatively as shown in FIGS. 3, 4, 5. The terminal requests the cardholder to enter the type of transaction and the amount at 59, which the cardholder does at 60, the terminal generates the Transaction Request Message at 61. The terminal generates a Secondary Key by decrypting the terminal identification using the Terminal Master Key at 62:

$$SK = D[KMT](TID). \quad (1)$$

The terminal generates Security Parameter 2 using function Reencrypt from Master Key and operands Secondary Key and Security Parameter 1 at 63 as specified below:

$$RFMK(SK, SP1) = E[D[KMT1](SK)](D[KMT](SP-1)) = SP2, \quad (2)$$

one implementation of which is shown in Table 1.

TABLE 1

| | | FUNCTION: REENCRYPT FROM MASTER KEY, RFMX (X, Y) | | |
|---|---|---|---|---|
| OPERATION | OPERAND | KEY REGISTER-KR | PLAIN TEXT REGISTER-PTR | CIPHER TEXT REGISTER-CTR |
| LOAD | KM0 into KR | KM0 | | |
| LOAD | Y into PTR | | Y | |
| DECRYPT | | | | D[KM0] (Y) |
| STORE | CTR | | | |
| GENERATE | KM1 in KR | KM1 | | |
| LOAD | X into PTR | | X | |
| DECRYPT | | | | D[KM1] (X) |
| GENERATE ODD PARITY | CTR | | | |
| TRANSFER | CTR to KR | D[KM1] (X) | | |
| LOAD | PTR | | D[KM0] (Y) | |
| ENCRYPT | | | | E[D[KM1] (X)] (D[KM0] (Y)) |
| CLEAR | KR | 0 | | |

The terminal generates Working Key using function Reencrypt from Master Key and operands Secondary Key and Security Parameter 2 at 64 as specified below:

$$RFMK(SK, SP2) = E[D[KMT1](SK)](D[KMT](SP-2)) = WK. \quad (3)$$

The terminals encrypts the Transaction Request Message using the Working Key at 65, as specified below:

$$E[WK](\text{Transactions Request Message}). \quad (4)$$

The terminal generates Security Parameter 3 using function Reencrypt to Master Key and operands Secondary Key and Working Key at 66 as specified below:

$$RTMK(SK, WK) = E[KMT](D[D[KMT2](SK)](W-K)) = SP3, \quad (5)$$

one implementation of which is shown in Table 2 below:

TABLE 2

| | | FUNCTION: REENCRYPT TO MASTER KEY, RTMX (X, Y) | | |
|---|---|---|---|---|
| OPERATION | OPERAND | KEY REGISTER-KR | PLAIN TEXT REGISTER-PTR | CIPHER TEXT REGISTER-CTR |
| LOAD | KM0 into KR | KM0 | | |
| GENERATE | KM2 to KR | KM2 | | |

TABLE 2-continued

FUNCTION: REENCRYPT TO MASTER KEY, RTMX (X, Y)

| OPERATION | OPERAND | KEY REGISTER-KR | PLAIN TEXT REGISTER-PTR | CIPHER TEXT REGISTER-CTR |
|---|---|---|---|---|
| LOAD | X into PTR | | X | |
| DECRYPT | | | | D[KM2](X) |
| GENERATE ODD PARITY | CTR | | | |
| TRANSFER | CTR to KR | D[KM2](X) | | |
| LOAD | Y into PTR | | Y | |
| DECRYPT | | | | D[D[KM2](X)](Y) |
| LOAD | KM0 into KR | KM0 | | |
| TRANSFER | CTR to PTR | | D[D[KM2](X)](Y) | |
| ENCRYPT | | | | E[KM0](D[D[KM2](X)](Y)) |
| CLEAR | KR | 0 | | |

The terminal generates Transmitted Key using function Reencrypt to Master Key and operands Secondary Key and Security Parameter 3 at 67 as specified below:

$$RTMK(SK,SP3)=E[KMT](D[D[KMT2](SK)](SP-3))=TK \quad (6)$$

The terminal appends the Transmitted Key to the Transaction Request Message in addition to other routing, transit and control information required in the message header at 68. The terminal encrypts the complete message including the header using a link encryption key at 69 and transmits it to the centralized computer at 70. The centralized computer sends the message to the Security Module at 71, the Security Module decrypts the message using the link encryption key at 72, the Security Module sends the routing, transit and control information to the centralized computer at 73, the centralized computer determines whether this is an "on-us" transaction or an interchange transaction at 80. If it is an interchange transaction, additional processing is required which will be described later.

If this is not an interchange transaction, the centralized computer obtains various data from the accounting data base for which it may use the Terminal Identification to obtain the Terminal Master Key (encrypted) as may be stored similar to Table 3 and sends all the data to the Security Module at 74.

TABLE 3

| TERMINAL IDENTIFICATION | TERMINAL MASTER KEY (ENCRYPTED) |
|---|---|
| TID 1 | KMT 1 |
| TID 2 | KMT 2 |
| TID 3 | KMT 3 |
| TID 4 | KMT 4 |
| 0 | 0 |
| 0 | 0 |

TABLE 3-continued

| TERMINAL IDENTIFICATION | TERMINAL MASTER KEY (ENCRYPTED) |
|---|---|
| 0 | 0 |
| TID n | KMT n |
| 0 | 0 |
| 0 | 0 |
| 0 | 0 |

Security Module generates Security Parameter 3 using function Inverse Reencrypt to Master Key and operands Secondary Key and Transmitted Key at 75 as specified below:

$$RTMK^{-1}(SK,TK)=SP3=E[D[KMT2](SK)](D[KMT](TK)), \quad (7)$$

one implementation of which is shown in Table 4.

TABLE 4

FUNCTION: INVERSE REENCRYPT TO MASTER KEY, RTMK$^{-1}$ (X, W)

| OPERATION | OPERAND | KEY REGISTER-KR | PLAIN TEXT REGISTOR-PTR | CIPHER TEXT REGISTER-CTR |
|---|---|---|---|---|
| LOAD | KM0 into KR | KM0 | | |
| LOAD | W into PTR | | W | |
| DECRYPT | | | | D[KM0] (W) |
| STORE | CTR | | | |
| GENERATE | KM2 in KR | KM2 | | |
| LOAD | X into PTR | | X | |
| DECRYPT | | | | D[KM2] (X) |
| GENERATE ODD PARITY | CTR | | | |
| TRANSFER | CTR to KR | D[KM2] (X) | | |
| LOAD | PTR | | D[KM0] (W) | |
| ENCRYPT | | | | E[D[KM2] (X)] (D[KM0] (W)) |
| CLEAR | KR | 0 | | |

The Security Module generates the Working Key using function Inverse Reencrypt to Master Key and operands Secondary Key and Security Parameter 3 at 76 as specified below:

$$RTMK^{-1}(SK,SP3)=WK=E[D[KMT2](SK)](D[KMT](SP3)). \quad (8)$$

The Security Module decrypts the Transaction Request Message using the Working Key at 77, as specified below:

$$D[WK](\text{Transaction Request Message}). \quad (9)$$

The Security Module generates Security Parameter 2 using function Inverse Reencrypt from Master Key and operands Secondary Key and Working Key at 78, as specified below:

$$RFMK^{-1}(SK,WK) = SP2 = E[KMT](D[D[KMT1](SK)](WK)), \quad (10)$$

one implementation of which is shown in Table 5.

TABLE 5

FUNCTION: INVERSE REENCRYPT FROM MASTER KEY, $RFMX^{-1}(X,Y)$

| OPERATION | OPERAND | KEY REGISTER-KR | PLAIN TEXT REGISTER-PTR | CIPHER TEXT REGISTER-CTR |
|---|---|---|---|---|
| LOAD | KM0 into KR | KM0 | | |
| GENERATE | KM1 to KR | KM1 | | |
| LOAD | X into PTR | | X | |
| DECRYPT | | | | D[KM1](X) |
| GENERATE ODD PARITY | CTR | | | |
| TRANSFER | CTR to KR | D[KM1](X) | | |
| LOAD | Z into PTR | | Z | |
| DECRYPT | | | | D[D[KM1](X)](Z) |
| LOAD | KM0 into KR | KM0 | | |
| TRANSFER | CTR to PTR | | D[D[KM1](X)](Z) | |
| ENCRYPT | | | | E[KM0](D[D[KM1](X)](Z)) |
| CLEAR | KR | 0 | | |

The Security Module generates Security Parameter 1 using function Inverse Reencrypt from Master Key and operands Secondary Key and Security Parameter 2 at 79 as specified below:

$$RFMK^{-1}(SK,SP2) = SP1 = E[KMT](D[D[KMT1](SK)](SP2)) \quad (11)$$

The Security Module recovers part of the Primary Account Number, part of the Personal Identification Number, part of the card anti-counterfeiting number from Security Parameter 1 if FIG. 6 was originally used at the terminal 81 or whatever was used if alternative FIGS. 3, 4 or 5 were used. The Security Module recovers the remainder of the Primary Account Number from the decrypted Transaction Request Message and sends the complete number to the centralized computer at 82, the centralized computer retrieves the encrypted Personal Identification Number and the card anti-counterfeiting feature number from the accounting data base using the Primary Account Number at 83 as may be stored similar to Table 6.

TABLE 6

| PRIMARY ACCOUNT NUMBER | PERSONAL INDENTIFICATION NUMBER (ENCRYPTED) | CARD SIGNATURE |
|---|---|---|
| PAN 1 | PIN 1 | CS 1 |
| PAN 2 | PIN 2 | CS 2 |
| PAN 3 | PIN 3 | CS 3 |
| 0 | 0 | 0 |
| 0 | 0 | 0 |
| 0 | 0 | 0 |
| PAN n | PIN n | CS n |
| 0 | 0 | 0 |
| 0 | 0 | 0 |
| 0 | 0 | 0 |

The centralized computer sends the data to the Security Module to validate the transaction at 84, the Security Module compares the Personal Identification Number obtained from the Accounting Data Base after appropriate decryption with that generated from the Transaction Request Message and compares the two anti-counterfeiting numbers to validate the transaction at 85, 86. If the transaction does not appear valid, the Security Module indicates that the centralized computer should specify to the terminal a request that the cardholder re-enter his Personal Identification Number at 87 shown in FIG. 7B which the centralized computer does at 88, returning to processing at 51 shown in FIG. 7A.

If the transaction appears valid, the Security Module notifies the centralized computer at 89, the centralized computer executes the remainder of the approval procedure at 90, generates an approval or disapproval response and sends it to the Security Module at 91. The Security Module encrypts the response using the Working Key and returns it to the centralized computer at 92, the centralized computer transmits the response to the terminal at 93. The terminal decrypts the response using the Working Key at 94, the terminal provides the service if approved or displays a message if disapproved at 95, the terminal generates an acknowledgement at 96, the terminal encrypts the acknowledgement using the Working Key and transmits it to the centralized computer at 97. The centralized computer sends the acknowledgement to the Security Module at 98, the Security Module decrypts the acknowledgement and notifies the centralized computer at 99, the centralized computer updates the account data base and notifies the Security Module and the Terminal at 100, the Security Module destroys the Working Key at 101, the Terminal updates the magnetic stripe if required and returns the card to the cardholder at 103, the Terminal destroys the Working Key at 104, and the transaction is complete at 102.

If the transaction is an interchange transaction, the centralized computer (acquirer) uses the Bank Identification Number or similar designation to obtain the encrypted Site Master Interchange Key, the encrypted Passwork, the Computer Identification (acquirer) as may be stored similar to Table 7 in addition to the data normally retrieved and sends it all to the Security Module at 105. The Security Module uses the Site Master Interchange Key in place of the Terminal Master Key, uses the Password in place of the Personal Identification Number, uses the Computer Identification in place of the Terminal Identification, uses the Bank Identification Number in place of the Primary Account Number and uses part of the Time field to generate an Interchange Working Key as was done at 62 to 64 in FIG. 7A, at 106. The Security Module encrypts the Terminal Identification and the Terminal Master Key (after it has first been decrypted), using the Interchange Working Key, generates an Interchange Transmitted Key as was done at 66, 67 in FIG. 7A, appends the Interchange Transmitted Key, the header and control information to the Transaction Request Message and encrypts it using a link encryption key at 107, the Security Module sends the transaction to the acquirer centralized computer at

108. The acquirer centralized computer transmits the transaction to the issuer centralized computer at 109, the issuer centralized computer sends the message to the issuer Security Module at 110 shown in FIG. 7C.

TABLE 7

| BANK IDENTIFICATION NUMBER | SITE MASTER INTERCHANGE KEY (ENCRYPTED) | PASSWORD (ENCRYPTED) | COMPUTER IDENTIFICATION |
|---|---|---|---|
| BIN 1 | SMIK 1 | PW 1 | CID 1 |
| BIN 2 | SMIK 2 | PW 2 | CID 2 |
| BIN 3 | SMIK 3 | PW 3 | CID 3 |
| 0 | 0 | 0 | 0 |
| 0 | 0 | 0 | 0 |
| 0 | 0 | 0 | 0 |
| BIN n | SMIK n | PW n | CID n |
| 0 | 0 | 0 | 0 |
| 0 | 0 | 0 | 0 |
| 0 | 0 | 0 | 0 |

The Security Module decrypts the transaction using the Link Encryption Key, sends the header and control information to the issuer Centralized Computer at 111, the issuer Centralized Computer uses the information to retrieve the encrypted Site Master Interchange Key, the encrypted Password and the Computer Identification and sends it to the Security Module at 112, the Security Module uses the same procedure as was used at 75, 76 in FIG. 7A, to recover the Interchange Working Key at 113 and uses the same procedure as was used at 78, 79, 81 in FIG. 7A, to recover the Password which is validated at 113. The Security Module uses the Interchange Working Key to recover the Terminal Identification and Terminal Master Key by decryption at 114. The remainder of the procedure to recover the Personal Identification Number, to validate and approve the transaction and generate a response is the same as was used at 75 to 79, 81 to 91 in FIGS. 7A and 7B at 115. The issuer Security Module encrypts the response that will go to the terminal using the Working Key at 116, encrypts the response to acknowledgement to go to the acquirer centralized computer using the Interchange Working Key and sends it to the issuer Centralized Computer at 117. The issuer Centralized Computer transmits the response to the acquirer centralized computer at 118, the acquirer Centralized Computer sends the response to the Security Module at 119, the Security Module decrypts the response using the Interchange Working Key and sends to the acquirer Centralized Computer the part of the response that is to be transmitted to the terminal and the Centralized Computer updates its in-process file at 121. The terminal follows the same procedures as in 94 to 97 in FIG. 7B, at 122. The acquirer Centralized Computer relays the acknowledgement to the issuer Centralized Computer at 123, the issuer Centralized Computer follows the same procedure as in 98 to 101 in FIG. 7B, at 124. The acquirer Centralized Computer updates the in-process file, relays notification to terminal at 128, the acquirer Security Module destroys the Working Key at 125, the terminal updates the magnetic stripe if required, returns the card to the cardholder at 129, destroys the Working Key at 126, and the transaction is complete at 127.

Considering FIG. 1, "Computer with transmission means," 14, may consist of an IBM 370/148 Central Processing Unit (CPU), 3410 Tape units, 1403 Printer, 3705 Communications Controller, Bell 201C Data Sets. The Data Base may be accommodated on one or more IBM 3330 Disks, 15. The Cash Dispenser, 10, or ATM, 11, may consist of IBM 3614's that may include an Intel 8080 microprocessor and Motorola MGD8080DSM Data Security Module. The Security Module, 13, or 17, may consist of an Intel 8080 microprocessor and a Motorola MGD8080DSM Data Security Module. The other computer shown in FIG. 1, 16, may consist of a Burroughs 7766 CPU, 9495 Tape units, 9373 Disk units (18), Documation 1500 printer, Burroughs 7350 Communications Controller, TA1201 Data Sets, and RT 4000 Cash Dispensers or ATM's deployed similar to those shown communicating with the computer system, 14. In either case, the terminals indicated in 12 may be IBM 3604, 3612, or 3610 or Burroughs TU700, TC700. The communication lines may be 300 to 1200 baud, synchronous or asynchronous.

It will be recognized by those skilled in the art that the particular devices indicated are for illustrative purposes only and do not change or limit the scope of the invention. For instance, CPU's manufactured by NCR, or Univac can be used, other ATM's, peripheral or communication devices manufactured by Varian, Memorex, DEC, NCR, Docutel, FDSI, Diebold, Tandem, Mosler, Bunker Ramo or others could have been substituted for the system components indicated. Similarly, microprocessors such as the Intel 8048 or 8085, Motorola 6800, PDP11 could have been specified rather than the Intel 8080 and would suffice with appropriate changes to the program that follows. Also, LSI devices that implement the DES manufactured by Fairchild, Western Digital, Collins-Rockwell, IBM or others could have been substituted for the Motorola device without changing or limiting the scope of the invention.

The set of programs which follow implements the procedure previously described using an Intel 8080 Microprocessor with an attached Motorola MGD8080DSM Data Security Module. These devices are one possible implementation of the "Security Module" 13, FIG. 1. The programs are "stand-alone" for test purposes. That is, there has been no attempt to integrate these programs into the programs required for an operating, on-line network. However, any of several operating network programs can easily be modified to use the programs shown here by placing the proper set of "CALL's" at appropriate points of the operating program since the programs included here are comprehensive in that they implement all the functions required to mechanize the security procedure described in earlier sections of this application. Although this test program uses the DES in Electronic Code Book Mode exclusively, the DES may be used in Cipher Feedback or Block Chaining mode at appropriate places without limiting or changing the scope of the invention.

The programs are divided into:

1. A main routine to generate either WK and TK given SP1, TID and KMT or generate WK and SP1 given TK, TID and KMT. The same program may be used at a terminal or at a HPC, with the proper parameter supplied to the program. The difference is that at the HPC, the terminal Master Key, KMT, is encrypted using the Host Master Key, KMO, while at the terminal, KMT is not encrypted. In addition, SP1 is a starting parameter at the terminal and TK is a starting parameter at the HPC. These differences are accommodated within the programs.

2. A set of subroutines that perform smaller, "building block" functions that the main routine sequences in an order that provides for implementing the security procedure previously described.

3. A testing program that simulates the operations that would normally take place at a terminal and those that would normally take place at a HPC. The procedure at the terminal is to use the remainder of the programs to generate TK and WK after SP1, KMT and TID are supplied. Then, a Transaction Request test message is enciphered using WK, and transmission of the message and TK to the HPC is simulated.

At the HPC, generation of WK and SP1 is accomplished given TK, KMT, TID, using the same set of programs, and the test message is deciphered using WK. Both versions of the test message, and both versions of SP1 and WK are compared for equality. If they are equal, the HPC program initiates the encipherment of a response message and simulates transmission to the terminal.

The terminal program initiates decipherment of the response message using WK and compares it to the original message. If the fields compared are equal, the test program halts at a normal stop. If any fields compared are not equal, the program stops at an error halt.

4. All constants, parameters, space for intermediate results and working storage are included within the set of programs given so that an operating program can easily be developed by deleting those portions included only for testing purposes. Once initiated, the testing program performs all functions and tests, and runs to completion if there are no errors. A summary description of each of the routines and subroutines follows.

5. MROUT, Main Routine.

Given SP1, TID, KMT, generates all the intermediate values required and produces WK and TK by sequencing the remainder of the routines as required. Alternatively, given TK, TID, KMT, then WK and SP1 are generated. The proper parameter is required.

6. MWKLD, Load Master Key into Master Key Register and Active Register or load a Working Key into the Active Register, depending on the parameter supplied. The key is not deciphered in either case.

7. NGEDR, Encipher or Decipher N Groups of 8 Bytes, no more than 254 groups or 2032 bytes. Since the devices that implement the DES require integral multiples of 8 bytes, this routine has been so organized. The routine requires a parameter to distinguish between encipherment and decipherment.

8. EDCPR, Encipher or Decipher 8 Bytes. This routine is one of the smallest building blocks and interfaces directly to the Data Security Module. A parameter distinguishes between encipherment and decipherment.

9. MOVE7, Move 7 Bytes.

This subroutine is included because of the chracteristics of the specific hardware device chosen to illustrate the implementation of the security procedure described in this application. It transfers the first 7 of the 8 required bytes to the Data Security Module.

10. MKODD, Make 8 Bytes Odd Parity.

Since the DES requires that each 8 bit-byte that is part of an 8 byte group used as a key, have an odd parity bit as the rightmost bit, and since the security procedure described in this application requires that in some cases, the cipher text output be used as an encipher or decipher key, this routine insures that the proper parity is generated in all those 8 byte groups used as a key.

11. GNMKV, Routine to Generate Master Key Variants V1 or V2.

This routine modifies the Master Key as required to generate the 2 variants required. As a result, with current devices, the Master Key must be stored within the microprocessor in addition to being stored in the Master Key Register. However, the "chips" or LSI devices that implement the DES can be redesigned so that in the future, the additional storage is not required and the Variants could be generated within the LSI device.

12. WKLOD, Working Key Load Routine.

This routine first deciphers the Working Key using the Master Key and immediately loads the deciphered key into the Active Key Register where it can be used for enciphering or deciphering data. Ahtough not used by the testing program, this routine will be required in any operational network and, so, is included.

13. DELAY, Routine for Programmed Delays of more than 255 Instruction Execution Times.

In order to simplify these programs to facilitate testing, the "interrupt" system was not used in the interface between the 8080 microprocessor and the MGD8080DSM Data Security Module. Instead, delays were programmed to accommodate the 320 microseconds required for encipherment or decipherment by the Data Security Module. This routine permits variable delays to a maximum of 60,000 Instruction Execution Times depending on the parameter supplied.

14. MOVEN, Move N Bytes.

Because of the limited functionality of current microprocessors, this routine was included to facilitate transfers of fields and thereby reduce the size of the other routines. Depending on the parameter supplied, up to 256 bytes can be moved.

15. COMPR, Compare 2 Fields Routine.

This routine is used during the debugging of the remainder of the routines to compare the two versions of SP1, WK, and the two test messages. This routine may be removed after testing is completed.

16. START, Routine to Debug, Simulates the Terminal and HPC.

This routine is used only for testing the remainder of the set of programs by simulating calls to the Main Routine as if from a Terminal and a HPC, and comparing the results. It uses a set of constants and parameters which may also be deleted after testing is complete. Once initiated at START, it runs to completion at FINIS. If there are errors, various error halts are included within each of the routines.

17. Before assembling the program, a starting location must be selected for storage of the program and storage of the working storage, which requires that at least an ORG and a DSEG be added to the beginning of the Main Routine. An additional DSEG may be required at the beginning of the constants just preceding BPARAM.

18. A Master Key, KMO, must be generated or selected and entered into 8 successive locations starting at KMO.

19. A KMT must be selected or generated and entered starting at KMT. Then, KMT must be encrypted by KMO and entered starting at EKMT (E[KMO](KMT)=EKMT).

20. A TID must be chosen and entered starting at DTID.

21. An SP1 must be chosen and entered starting at DSP1.

22. The interface between the 8080 and the DSM must be set by using the parameter specified in BPARAM to set the I/O ports on the 8080 or changing what is in BPARAM to correspond to settings already implemented. In addition, the parameters specified in the list starting at MKEYL and ending at WRTDAT must correspond to the interface settings.

23. The program is initiated at START and runs to FINIS if there are no errors.

LIST OF ERROR HALTS

| Label at Halt | Routine Name | Comes From (Label) | Reason |
|---|---|---|---|
| MHLT1 | MROUT | MERR1 | Parameter supplied neither 4 or 5 |
| MHLT2 | MROUT | MERR2 | Parameter supplied neither 4 or 5 |
| MHLT3 | MROUT | MERR3 | Parameter supplied neither 4 or 5 |
| MWKHT1 | MWKLD | MWER1 | DSM Status = Busy |
| MWKHT2 | MWKLD | MWER2 | DSM Parity Error |
| MWKHT3 | MWKLD | MWER3 | DSM Timed Out |
| EDCP4 | EDCPR | EDER1 | DSM Status = Busy |
| EDCP5 | EDCPR | EDER2 | DSM Parity Error |
| EDCP6 | EDCPR | EDER3 | DSM Timed Out |
| MVE3 | MOVE7 | MVER1 | DSM Parity Error |
| MVE4 | MOVE7 | MVER2 | DSM Timed Out |
| WKL2 | WKLOD | WKER2 | DSM Parity Error |
| WLK3 | WKLOD | WKER3 | DSM Timed Out |
| WKL4 | WKLOD | WKER1 | DSM Status = Busy |
| CMPR3 | COMPR | CMPR2 | The 2 fields being compared are not equal |
| DBUG4 | START | DBER1 | DSM Parity Error |
| DBUG5 | START | DBER2 | DSM timed out or not ready |

| NAME/LABEL | OP CODE | OPERAND | COMMENTS |
|---|---|---|---|
| | | | ; MAIN ROUTINE, CAN BE USED AT |
| | | | ; TERMINAL OR AT HOST PRO- |
| | | | ; CESSING CENTER (HPC). IF |
| | | | ; USED AT TERMINAL, WK & TK |
| | | | ; ARE GENERATED GIVEN SP1, TID, |
| | | | ; AND KMT. ALL INTERMEDIATE |
| | | | ; VALUES ARE GENERATED. WK |
| | | | ; HAS ODD PARITY AFTER COMPLE- |
| | | | ; TION OF THE ROUTINE. AFTER |
| | | | ; COMPLETION, THE OPERATING |
| | | | ; PROGRAM MUST REQUEST ENCI- |
| | | | ; PHERMENT OF THE TRANSAC- |
| | | | ; TION REQUEST MESSAGE USING |
| | | | ; WK BY MAKING 2 CALLS, ONE |
| | | | ; TO LOAD WK INTO ACTIVE REG. |
| | | | ; & ONE TO ENCIPHER N-8 BYTE |
| | | | ; GROUPS, APPEND TK AND TRANS |
| | | | ; MIT THE TRANSACTION RE- |
| | | | ; QUEST MESSAGE (TRM) TO THE |
| | | | ; HPC. WK IS SAVED IN ORDER |
| | | | ; TO DECIPHER RESONSE MESSAGE |
| | | | ; RECEIVED FROM THE HPC. |
| | | | ; REQUIRES MVI A, 5H (ENCIPH.) |
| | | | ; |
| | | | ; IF USED AT HOST PROCESSING |
| | | | ; CENTER (HPC), WK & SP1 ARE |
| | | | ; GENERATED GIVEN TK, TID & |
| | | | ; KMT, ALL REQUIRED INTER |
| | | | ; MEDIATE VALUES ARE GENER- |
| | | | ; ATED. WK HAS ODD RARITY. |
| | | | ; AFTER COMPLETION OF ROUTINE |
| | | | ; THE OPERATING PROGRAM MUST |
| | | | ; REQUEST DECIPHERMENT OF THE |
| | | | ; TRM USING WK BY MAKING 2 |
| | | | ; CALLS, ONE TO LOAD WK INTO |
| | | | ; ACTIVE REGISTER & ONE TO |
| | | | ; DECIPHER N-8 BYTE GROUPS |
| | | | ; VALIDATE THE PIN, ETC. IN |
| | | | ; SP1 TO AUTHENTICATE THE |
| | | | ; TRANSACTION, PREPARE A RE- |
| | | | ; SPONSE, USE CALLS TO ENCI- |
| | | | ; PHER RESPONSE USING WK, AND |
| | | | ; TRANSMIT RESPONSE TO THE |
| | | | ; TERMINAL. REQUIRES |
| | | | ; MVI A, 4H (DECIPHER). |
| | | | ; IN ADDITION, IN H & L REG. |
| | | | ; MUST BE THE ADDRESS OF THE |
| | | | ; FIRST OF A LIST OF 5 |
| | | | ; ADDRESSES AS FOLLOWS- |
| | | | ;   1. ADDR. OF SP1 LOCATION. IF |

```
                         ;  AT TERMINAL OR INTO
                         ;  WHICH SP1 PLACED IF AT
                         ;  HPC
                         ;  2. ADDR. OF TID LOCATION
                         ;  3. ADDR. OF KMT LOCATION
                         ;     (KMT ENCIPHERED USING
                         ;     KMO IF AT HPC)
                         ;  4. ADDR. OF 8-BYTE AREA
                         ;     INTO WHICH WK WILL BE
                         ;     PLACED
                         ;  5. ADDR. OF 8-BYTE AREA
                         ;     INTO WHICH TK WILL BE
                         ;     PLACED IF AT TERMINAL
                         ;     OR ADDR. OF TK LOC.
                         ;     IF AT HPC.
                         ;
                         ; MVI A,5H IF TERMINAL OR
                         ; MVI A,4H IF HPC
                         ; LXI H, ADDRESS
                         ; CALL MROUT
                         ;
             NAME        SENDRO
MROUT:       PUSH        PSW
             PUSH        B
             PUSH        D
             STA         MRPAR         ; STORE EN/DE PAR
                                       ; AMETER
             LXI         B, 2H         ; CONSTANT TO B
                                       ; FOR ADDR. MODIF-
                                       ; ICATION
             SHLD        IADSP1        ; STORE INDIR. SP1
             DAD         B             ; INCR. ADDR.
             SHLD        IADTID        ; STORE INDIR. TID
             DAD         B             ; INCR. ADDR.
             SHLD        IADKMT        ; STORE INDIR. KMT
             DAD         B             ; INCR. ADDR.
             SHLD        IADWK         ; STORE INDIR. WK
             DAD         B             ; INCR. ADDR.
             SHLD        IADTK           STORE INDIR. TK
             LDA         MRPAR         ; LOAD EN/DE PARAM.
             CPI         5H            ; COMPARE- IF TERM.
             JZ          MRT1          ; IF TERMINAL, SKIP
                                       ; DECIPHERING KMT
             CPI         4H            ; COMPARE IF HPC
MERR1:       JNZ         MHLT1         ; JUMP TO ERROR
                                       ; HALT-NOT HPC
             MVI         A, 3H         ; PARAMETER TO LHLD
             LXI         H, KMO        ; LOAD MASTER KEY
                                       ; AS ACTIVE KEY
             CALL        MWKLD         ; CALL ROUTINE
             LHLD        IADKMT        ; INDIR. KMT ADDR
                                       ; TO H REG.
             SHLD        $ + 1         ; STORE IN INSTR.
             LHLD        00H           ; KMT ADDR TO H
             MVI         A, 4H         ; PARAM. TO A
             LXI         D, KMT        ; LOCATION INTO
                                       ; WHICH KMT WILL
                                       ; BE PUT AFTER IT
                                       ; IS DECIPHERED
                                       ; USING KMO
             CALL        EDCPR         ; DECIPHER KMT
             LXI         H, KMT        ; KMT (DECIPHERED)
                                       ; ADDRESS TO H
             CALL        MKODD         ; MAKE ODD PARITY
MRT1:        MVI         A,01000001B   ; VARIANT 1 PARAM
                                       ; TO A REG.
             LXI         D, KMT1       ; KMT1 ADDR TO D
             LXI         H, KMT        ; KMT ADDR TO H
             CALL        GNMKV         ; MAKE VARIANT 1
             MVI         A,00001001B   ; VARIANT 2 PARAM
             LXI         D, KMT2       ; KMT2 ADDR TO D
             LXI         H, KMT        ; KMT ADDR TO H
             CALL        GNMKV         ; MAKE VARIANT 2
             LHLD        IADKMT        ; INDIR KMT ADDR
                                       ; TO H REG
             SHLD        $ + 1         ; STORE IN INSTR.
             LHLD        00H           ; KMT ADDR TO H
             MVI         A, 3H         ; PARAM. TO A
             CALL        MWKLD         ; LOAD KMT AS
                                       ; ACTIVE KEY
             LHLD        IADTID        ; INDIR TID ADDR
                                       ; TO H REG
```

|        |       | -continued |                          |
|--------|-------|------------|--------------------------|
|        | SHLD  | $ + 1      | ; STORE IN INSTR.        |
|        | LHLD  | 00H        | ; TID ADDR TO H          |
|        | LXI   | D, SK      | ; ADDR SK TO H           |
|        | MVI   | A, 4H      | ; DECIPHER PARAM         |
|        |       |            | ; TO A REG.              |
|        | CALL  | EDCPR      | ; GENERATE SK =          |
|        |       |            | ; D/KMT/(TID)            |
|        | LXI   | H, KMT1    | ; KMT1 ADDR TO A         |
|        | MVI   | A, 3H      | ; PARAM TO H             |
|        | CALL  | MWKLD      | ; LOAD KMT1 AS           |
|        |       |            | ; ACTIVE KEY             |
|        | MVI   | A, 4H      | ; DECIPH. PAR. A         |
|        | LXI   | H, SK      | ; SK ADDR TO H           |
|        | LXI   | D, DT1SK   | ; ADDR TO D              |
|        | CALL  | EDCPR      | ; GENERATE               |
|        |       |            | ; D/KMT1/(SK)            |
|        | LXI   | H, DT1SK   | ; ADDR TO H              |
|        | CALL  | MKODD      | ; MAKE ODD PARITY        |
|        | MVI   | A, 3H      | ; PARAM TO A             |
|        | LXI   | H, KMT2    | ; KMT2 ADDR TO H         |
|        | CALL  | MWKLD      | ; LOAD KMT2 AS           |
|        |       |            | ; ACTIVE KEY             |
|        | MVI   | A, 4H      | ; DECIPHER PARAM         |
|        |       |            | ; TO A REG               |
|        | LXI   | H, SK      | ; ADDR SK TO H           |
|        | LXI   | D, DT2SK   | ; ADDR TO D              |
|        | CALL  | EDCPR      | ; GENERATE               |
|        |       |            | ; D/KMT2/(SK)            |
|        | LXI   | H, DT2SK   | ; ADDR TO H              |
|        | CALL  | MKODD      | ; MAKE ODD PARITY        |
|        | LDA   | MRPAR      | ; LOAD EN/DE PAR.        |
|        | CPI   | 4H         | ; COMPARE IF HPC         |
|        | JZ    | MRT2       | ; IF HPC, JUMP TO        |
|        |       |            | ; OTHER ROUTINE          |
|        | CPI   | 5H         | ; COMPARE IF             |
|        |       |            | ; TERMINAL               |
| MERR2: | JNZ   | MHLT2      | ; JUMP TO ERROR          |
|        |       |            | ; HALT-NOT TERM.         |
|        | MVI   | B, 8H      | ; COUNT TO B             |
|        | LXI   | D, TEMP1   | ; TO ADDR TO D           |
|        | LXI   | H, DT1SK   | ; FROM ADDR TO H         |
|        | CALL  | MOVEN      | ; MOVE 8 BYTES,          |
|        | MVI   | B, 8H      | ; COUNT TO B             |
|        | LXI   | D, TEMP2   | ; TO ADDR TO D           |
|        | LXI   | H, DT2SK   | ; FROM ADDR TO H         |
|        | CALL  | MOVEN      | ; DT2SK TO TEMP2         |
|        | LHLD  | IADSP1     | ; INDIR SP1 ADDR         |
|        |       |            | ; TO H REG               |
|        | SHLD  | $ + 1      | ; STORE IN INSTR.        |
|        | LHLD  | 00H        | ; SP1 ADD TO H           |
|        | MVI   | B, 8H      | ; COUNT TO B             |
|        | LXI   | D, TEMP3   | ; TO ADDR TO D           |
|        | CALL  | MOVEN      | ; SP1 TO TEMP3           |
|        | JMP   | MRT3       | ; JUMP TO CONTINUE       |
|        |       |            | ; ROUTINE                |
|        |       | ;          |                          |
|        |       | ; SUBROUTINE- | IF HPC, SIMILAR       |
|        |       | ; TO PREVIOUS | ROUTINE               |
|        |       | ;          |                          |
| MTR2:  | MVI   | B, 8H      | ; COUNT TO B             |
|        | LXI   | D, TEMP1   | ; TO ADDR TO D           |
|        | LXI   | H, DT2SK   | ; FROM ADDR TO H         |
|        | CALL  | MOVEN      | ; DT2SK TO TEMP1         |
|        | MVI   | B, 8H      | ; COUNT TO B             |
|        | LXI   | D, TEMP2   | ; TO ADDR TO D           |
|        | LXI   | H, DT1SK   | ; FROM ADDR TO H         |
|        | CALL  | MOVEN      | ; DT1SK TO TEMP2         |
|        | LHLD  | IADTK      | ; INDIR TK ADDR          |
|        |       |            | ; TO H REG.              |
|        | SHLD  | $ + 1      | ; STORE IN INSTR.        |
|        | LHLD  | 00H        | ; TK ADDR TO H           |
|        | MVI   | B, 8H      | ; COUNT TO B             |
|        | LXI   | D, TEMP3   | ; TO ADDR TO D           |
|        | CALL  | MOVEN      | ; TK TO TEMP3            |
|        |       |            | ; END OF SUBROUT.        |
|        |       | ; CONTINUE REST OF PROGRAM |          |
| MRT3:  | MVI   | A, 3H      | ; SET KMT ACTIVE         |
|        |       |            | ; PARAMETER              |
|        | LXI   | H, KMT     | ; ADDR TO H              |
|        | CALL  | MWKLD      | ; CALL ROUTINE           |
|        | MVI   | A, 4H      | ; DECIPH. PAR. TO A      |
|        | LXI   | H, TEMP3   | ; DATA TO BE             |

-continued

|      |           |                              |
|------|-----------|------------------------------|
|      |           | ; DECIPHERED                 |
| LXI  | D, TEMP4  | ; ADDR OF RESULT             |
| CALL | EDCPR     | ; GENERATE                   |
|      |           | ; D/KMT/(SP1) (E)            |
|      |           | ; OR D/KMT/(TK) (D)          |
| MVI  | A, 3H     | ; SET KEY ACTIVE             |
|      |           | ; PARAMETER                  |
| LXI  | H, TEMP 1 | ; ADDR TO H REG              |
|      |           | ; D/KMT1/(SK) (E)            |
|      |           | ; OR D/KMT2/(SK) (D)         |
| CALL | MWKLD     | ; LOAD INTO ACTIVE           |
|      |           | ; REGISTER                   |
| MVI  | A, 5H     | ; ENCIPHER PARAM.            |
|      |           | ; TO A REG.                  |
| LXI  | H, TEMP4  | ; DATA TO BE ENC-            |
|      |           | ; IPHERED                    |
| LXI  | D, SP2    | ; SP2 IF TERM.,              |
|      |           | ; SP3 IF HPC                 |
| CALL | EDCPR     | ; GENERATE SP2 OR            |
|      |           | ; SP3 (D)                    |
| MVI  | A, 3H     | ; SET KEY ACTIVE             |
|      |           | ; PARAMETER                  |
| LXI  | H, KMT    | ; KMT ADDR TO H              |
| CALL | MWKLD     | ; SET KMT AS                 |
|      |           | ; ACTIVE KEY                 |
| MVI  | A, 4H     | ; DECIPHER PARAM.            |
|      |           | ; TO A REG.                  |
| LXI  | H, SP2    | ; ADDR OF SP2 (E)            |
|      |           | ; OR SP3 (D) TO H            |
| LXI  | D, TEMP4  | ; ADDR. OF RESULT            |
| CALL | EDCPR     | ; GENERATE EITHER            |
|      |           | ; D/KMT/(SP2) (E)            |
|      |           | ; D/KMT/(SP3) (D)            |
| MVI  | A, 3H     | ; SET KEY ACTIVE             |
|      |           | ; PARAMETER                  |
| LXI  | H, TEMP1  | ; SET EITHER                 |
|      |           | ; D/KMT1/(SK) (E) OR         |
|      |           | ; D/K MT2/(SK) (D)           |
|      |           | ; ACTIVE                     |
| CALL | MWKLD     | ; SET KEY ACTIVE             |
| MVI  | A, 5H     | ; ENCIPH. PARAM TO A         |
| LXI  | H, TEMP4  | ; ADDR. OF EITHER            |
|      |           | ; D/KMT/(SP2) OR             |
|      |           | ; D/KMT/(SP3)                |
| LXI  | D, TWK    | ; RESULT ADDR TO D           |
| CALL | EDCPR     | ; GENERATE WK                |
| LXI  | H, TWK    | ; WK ADDR TO H               |
| CALL | MKODD     | ; MAKE WK ODD PARITY         |
| MVI  | A, 3H     | ; SET KEY ACTIVE             |
|      |           | ; PARAMETER                  |
| LXI  | H, TEMP2  | ; SET ACTIVE EITHER          |
|      |           | ; D/KMT2/(SK) (E)            |
|      |           | ; D/KMT1/(SK) (D)            |
| CALL | MWKLD     | ; SET KEY ACTIVE             |
| MVI  | A, 4H     | ; DECIPH PAR. TO A           |
| LXI  | H, TWK    | ; WK ADDR TO H               |
| LXI  | D, TEMP4  | ; RESULT ADDR TO D           |
| CALL | EDCPR     | ; GENERATE EITHER            |
|      |           | ; D/D/KMT2/(SK)/             |
|      |           | ; (WK) OR                    |
|      |           | ; D/D/KMT1/(SK)/             |
|      |           | ; (WK)                       |
| LXI  | H, KMT    | ; KMT ADDRESS TO H           |
| MVI  | A, 3H     | ; SET KEY ACTIVE             |
|      |           | ; PARAMETER                  |
| CALL | MWKLD     | ; SET KMT ACTIVE             |
| MVI  | A, 5H     | ; ENCIPH PAR. TO A           |
| LXI  | H, TEMP4  | ; ADDR. OF EITHER            |
|      |           | ; D/D/KMT2/(SK)/             |
|      |           | ; (WK) OR                    |
|      |           | ; D/D/KMT1/(SK)              |
|      |           | ; (WK)                       |
| LXI  | D, SP3    | ; RESULT ADDR TO D           |
| CALL | EDCPR     | ; GENERATE SP3 (E)           |
|      |           | ; OR SP2 (D)                 |
| MVI  | A, 3H     | ; SET ACTIVE PAR TO A        |
| LXI  | H, TEMP2  | ; ADDR OR EITHER             |
|      |           | ; D/KMT2/(SK) (E) OR         |
|      |           | ; D/KMT1/(SK) (D)            |
| CALL | MWKLD     | ; SET KEY ACTIVE             |
| MVI  | A, 4H     | ; DECIPH PARAM TO A          |
| LXI  | H, SP3    | ; ADDRESS OF EITHER          |

```
                LXI     D, TEMP4        ; SP3 (E) OR SP2 (D)
                CALL    EDCPR           ; RESLT ADDR TO D
                                        ; GENERATE EITHER
                                        ; D/D/KMT2/(SK)/(SP3)
                                        ; D/D/KMT1/(SK)/(SP2)
                MVI     A, 3H           ; SET KEY ACTIVE PAR.
                LXI     H, KMT          ; KMT ADDR TO H
                CALL    MWKLD           ; SET KMT ACTIVE
                MVI     A, 5H           ; ENCIPH PAR TO A
                LXI     H, TEMP4        ; ADDR OF EITHER
                                        ; D/D/KMT2/(SK)/(SP3)
                                        ; D/D/KMT1/(SK)/(SP2)
                LXI     D, TTK          ; RESULT ADDR TO D
                CALL    EDCPR           ; GENERATE EITHER
                                        ; TK OR SP1
                LHLD    IADWK           ; INDIR WK ADDR H
                SHLD    $ + 1           ; STORE IN INSTR.
                LHLD    00H             ; DIRECT WK ADDR H
                XCHG                    ; MOVE H TO D
                LXI     H, TWK          ; WK ADDR TO H
                MVI     B, 8H           ; COUNT TO B
                CALL    MOVEN           ; MOVE WK
                LDA     MRPAR           ; EN/DE PARAM TO A
                CPI     4H              ; COMPARE IF HPC
                JZ      MRT4            ; IF HPC, JUMP TO
                                        ; OTHER ROUTINE
                CPI     5H              ; COMPARE IF TERM
MERR3:          JNZ     MHLT3           ; JUMP TO ERROR
                                        ; HALT NOT TERM.
                LHLD    IADTK           ; INDIR TK ADDR H
                SHLD    $ + 1           ; STORE IN INSTR
                LHLD    00H             ; DIR. TK ADDR H
                XCHG                    ; MOVE H TO D
                LXI     H, TTK          ; ADD OF TK TO H
                MVI     B, 8H           ; COUNT TO B
                CALL    MOVEN           ; MOVE TK TO DTK
                JMP     MRT5            ; JUMP TO CONT.
                        ; IF HPC, TRANSFER SP1
                        ;
MRT4:           LHLD    IADSP1          ; INDIR SP1 ADDR
                                        ; TO H
                SHLD    $ + 1           ; STORE IN INSTR.
                LHLD    00H             ; DIR. SP1 ADR. H
                XCHG                    ; MOVE H TO D
                LXI     H, TTK          ; ADDR OF SP1 TO
                                        ; H REG.
                MVI     B, 8H           ; COUNT TO B
                CALL    MOVEN           ; MOVE SP1
MRT5:           POP     D
                POP     B
                POP     PSW
                RET                     ; RETURN
MHLT1:          HLT                     ; FROM MERR1, NOT
                                        ; 4 OR 5, NOT
                                        ; TERMINAL OR HPC
MHLT2:          HLT                     ; FROM MERR2 NOT
                                        ; 4 OR 5, NOT HPC
                                        ; OR TERMINAL
MHLT3:          HLT                     ; FROM MERR3, NOT
                                        ; HPC OR TERM,
                                        ; NOT 4 OR 5
                        ; MASTER OR WORKING KEY LOAD
                        ; ROUTINE NO DECIPHER
                        ; CALLING SEQUENCE
                        ; MVI A, PARAMETER
                        ; LXI H, MASKAD MASTER KEY
                        ; CALL MWKLD ADDRESS OR
                        ;       WORKING KEY
                        ;       ADDRESS
                        ; PARAM   = 2H FOR MASTER KEY
                        ;         = 3H FOR WORKING KEY
                        ;             TO BE ACTIVE KEY
                        ;
MWKLD:          PUSH    PSW
                PUSH    B
                PUSH    D
                MVI     B, 0H           ; CLEAR B REG
                MOV     C, A            ; MOVE PARAM TO C
                XCHG                    ; EXCHANGE D, H
                LHLD    BPARAM          ; LOAD BPARAM IN H
                DAD     B               ; ADD PARAM TO H
                SHLD    MWK2 + 1        ; STORE RESULT IN
```

-continued

|  |  |  |  |
|---|---|---|---|
|  | XCHG |  | ; INSTRUCTION |
|  |  |  | ; RESTORE H & L |
|  | IN | BPARAM + REDST | ; READ STATUS |
|  | ORA | A | ; SET FLAGS |
| MWER1: | JNZ | MWKHT1 | ; GO TO HALT |
|  | MVI | B, 8 | ; COUNT TO B REG |
| MWK1: | MOV | A, M | ; LOAD NTH CHAR |
| MWK2: | OUT | 0H | ; OUTPUT NTH CHAR |
|  | INX | H | ; INCR. FROM ADDR |
|  | DCR | B | ; DECR. COUNT |
|  | JNZ | MWK1 | ; LOOP |
|  | MVI | A, 50 | ; COUNT 50 TO A |
| MWK3: | DCR | A | ; DECR. A REG |
|  | JNZ | MWK3 | ; LOOP-PROG DELAY |
|  | IN | BPARAM + REDST | ; CHECK STATUS |
|  | ORA | A | ; SET FLAGS |
| MWER2: | JM | MWKHT2 | ; PARITY ERROR HLT |
| MWER3: | JNZ | MWKHT3 | ; TIME OUT HALT |
|  | POP | D | ; END ROUTINE |
|  | POP | B | ; HOUSEKEEPING |
|  | POP | PSW | ; |
|  | RET |  | ; RETURN |
| MWKHT1: | HLT |  | ; BUSY HALT |
| MWKHT2: | HLT |  | ; PARITY ERROR HLT |
| MWKHT3: | HLT |  | ; TIME OUT HALT |

```
; ROUTINE TO ENCIPHER OR
; DECIPHER N GROUPS OF 8
; BYTES, N NO MORE THAN 254D.
; ANY NUMBER OF BYTES THAT
; ARE AN INTEGRAL MULTIPLE OF
; 8 BYTES MAY BE PROCESSED
; TO A MAXIMUM OF 2032D.
; PARAMETER IN A REG
;     = 5H FOR ENCIPHER
;     = 4H FOR DECIPHER
; B REG = NUMBER OF 8 BYTE GROUPS
; D & E REG. CONTAINS ADDRESS
; OF RESULTS
; H & L REG. CONTAINS ADDRESS
; OF DATA TO BE ENCIPHERED
; OR DECIPHERED
; IF ENCIPHER, H = PLAIN TEXT
; IF DECIPHER, H = CIPHER TEXT
; MVI A, PARAMETER
; MVI B, N
; LXI H, FROM
; LXI D, TO
; CALL NGEDR
```

|  |  |  |  |
|---|---|---|---|
| NGEDR: | PUSH | PSW |  |
|  | STA | NGPAR | ; STORE PARAM |
|  | MOV | A, B | ; N TRANSF. TO A |
|  | STA | NGRPS | ; STORE N |
|  | SHLD | NFROM | ; STORE FROM ADD. |
|  | XCHG |  | ; |
|  | SHLD | NTOAD | ; STORE TO ADD. |
|  | XCHG |  | ; RESTORE |
|  | ADI | 00H | ; SET FLAGS |
|  | JZ | NGOUT | ; N = 0, COMPLETE |
|  | LDA | NGPAR | ; LOAD PARAM, A |
| NGD1: | CALL | EDCPR | ; CALL 8 BYTE EN/ |
|  |  |  | ; DE/CIPHER ROUT. |
|  | LDA | NGRPS | ; N TO A REG |
|  | DCR | A | ; DECR. N |
|  | STA | NGRPS | ; STORE N − 1 |
|  | JZ | NGOUT | ; IF ZERO, DONE |
|  | LHLD | NTOAD | ; TO ADR. TO H |
|  | LXI | B, 0008H | ; LOAD NO. 8, B & C |
|  | DAD | B | ; ADD 8 TO 'TO' |
|  |  |  | ; ADDRESS |
|  | SHLD | NTOAD | ; STORE MODIFIED |
|  |  |  | ; ADDRESS |
|  | XCHG |  | ; SWITCH 'TO' |
|  |  |  | ; ADDRESS TO D REG |
|  | LHLD | NFROM | ; FROM ADR. TO H |
|  | DAD | B | ; ADD 8 TO 'FROM' |
|  | SHLD | NFROM | ; STORE MODIFIED |
|  |  |  | ; ADDRESS |
|  | LDA | NGPAR | ; PARAM. TO A REG |
|  | JMP | NGD1 | ; JUMP TO CALL |
| NGOUT: | POP | PSW |  |
|  | RET |  | ; RETURN |

; ROUTINE TO ENCIPHER OR

```
                    ; DECIPHER 8 BYTES, THE
                    ; WORKING KEY MUST HAVE
                    ; PREVIOUSLY BEEN LOADED INTO
                    ; THE ACTIVE KEY REGISTER.
                    ; ADDRESS OF BYTES TO BE
                    ; EN- OR DECIPHERED IN H & L
                    ; REGISTER, ADDRESS IN WHICH
                    ; TO PLACE RESULT IN D & E REG.
                    ; PARAMETER IN A REG,
                    ; ENCIPHER = 5H
                    ; DECIPHER = 4H
                    ; HAS PRGRAMMED DELAY > 320
                    ; MICROSEC. USES MOVE7
                    ; MVI A, PARAMETER
                    ; LXI H, ADDR, DATA TO BE EN-
                    ; OR DECIPHERED
                    ; LXI D, ADDR, RESULTING 8 BYTE
                    ; CALL EDCPR
                    ;
EDCPR:   PUSH   PSW
         PUSH   B
         MVI    B, OOH              ; CLEAR B REG
         MOV    C, A                ; MOVE PARAM TO C
         SHLD   TEMP2               ; STORE H TEMPO-
                                    ; RARILY
         LHLD   BPARAM              ; LOAD BPARAM IN
                                    ; H REG.
         DAD    B                   ; ADD PARAM = 4H OR
                                    ; 5H TO BPARAM
         SHLD   EDCP1 + 1           ; STORE RESULT IN
                                    ; OUT INSTRUCT.
         LHLD   TEMP2               ; RESTORE H REG.
         IN     BPARAM + REDST      ; READ STATUS
         ORA    A                   ; SET FLAGS
EDER1:   JNZ    EDCP4               ; GO TO HALT
         CALL   MOVE 7              ; FIRST 7 BYTES
                                    ; TRANSMITTED OUT
EDCP1:   OUT    OOH                 ; 8th BYTE OUT
         LXI    B, 500              ; COUNT TO B REG.
EDCP2:   CALL   DELAY               ; PROGRAMMED DELAY
         NOP                        ; > 320 MICROSEC
         IN     BPRAM + REDST       ; READ STATUS
         ORA    A                   ; SET FLAGS
EDER2:   JM     EDCP5               ; GO TO PARITY HLT
EDER3:   JNZ    EDCP6               ; GO TO TIME OUT
         MVI    B, 8H               ; COUNTER TO B
EDCP3:   IN     BPARAM + RDDAT      ; READ NTH BYTE
         STAX   D                   ; STORE NTH BYTE
         INX    D                   ; INCR. ADDR
         DCR    B                   ; DECR. COUNT
         JNZ    EDCP3               ; LOOP
         POP    B
         POP    PSW
         RET                        ; RETURN
EDCP4:   HLT                        ; BUSY HALT
EDCP5:   HLT                        ; PARITY HALT
EDCP6:   HLT                        ; TIME OUT HALT
                    ; MOVE7 SUBROUTINE TO MOVE
                    ; FIRST 7 BYTES, USED BY LOAD
                    ; WORKING KEY ROUTINE AND OTHER
                    ; REQUIRES LEFT MOST ADDRESS
                    ; IN H & L REGISTER, LXI H, ADR
                    ; CALL MOVE 7
MOVE7:   PUSH   PSW
         PUSH   B
         MVI    B, 7                ; COUNT TO B REG
MVE1:    MOV    A, M                ; NTH BYTE TO A
         OUT    BPARAM + WRTDAT     ; WRITE NTH BYTE
         INX    H                   ; INCR FROM ADDR
         DCR    B                   ; DECR. COUNT
         JNZ    MVE1                ; LOOP
         MV1    A, 50               ; PROGRAMMED
MVE2:    DCR    A                   ;
         JNZ    MVE2                ; DELAY
         IN     BPARAM + REDST      ; CHECK STATUS
         ORA    A                   ; SET FLAGS
MVER1:   JM     MVE3                ; PARITY ERROR HL
MVER2:   JNZ    MVE4                ; TIME OUT HALT
         MOV    A, M                ; MOVE 8TH CHAR TO
                                    ; A REG FOR FINAL
                                    ; WRITE
         POP    B
```

-continued

|        | POP   | PSW            |                          |
|        | RET   |                | ; RETURN                 |
| MVE3:  | HLT   |                | ; PARITY HALT            |
| MVE4:  | HLT   |                | ; TIME OUT HALT          |

```
; MAKE ODD PARITY, 8 BYTES,
; ADDRESS IN H & L
; LXI H, ADDR
; CALL MKODD
```

|         |       |             |                          |
|---------|-------|-------------|--------------------------|
| MKODD:  | PUSH  | PSW         |                          |
|         | PUSH  | B           |                          |
|         | MVI   | B, 8H       | ; COUNT B                |
| MKD2:   | MOV   | A, M        | ; LOAD NTH BYTE          |
|         | ADI   | OOH         | ; SET PARITY FLAG        |
|         | JPO   | MKD1        | ; IF PARITY IS           |
|         |       |             | ; ODD, SKIP 2 INST-      |
|         |       |             | ; RUCTIONS               |
|         | XRI   | 00000001B   | ; MAKE RITE MOST         |
|         |       |             | ; BIT ODD PARITY         |
|         | MOV   | M, A        | ; STORE NTH BYTE         |
| MKD1:   | INX   | H           | ; INCR ADDRESS           |
|         | DCR   | B           | ; DECR. COUNT            |
|         | JNZ   | MKD2        | ; LOOP                   |
|         | POP   | B           |                          |
|         | POP   | PSW         |                          |
|         | RET   |             | ; RETURN                 |

```
; ROUTINE TO GENERATE MASTER
; KEY VARIANTS V1 OR V2 FROM
; MASTER KEY
; A REG CONTAINS PARAMETER TO
; SPECIFY WHICH VARIANT
; V1 = 01000001B
; V2 = 00001001B
; D & E CONTAINS ADDR OF VARIANT
; H & L ADDRESS OF MASTER KEY
; MVI A, PARAMETER
; LXI D, VARIANT (LOCATION)
; LXI H, MASTER KEY (LOCATION)
; CALL GNMKV
```

|         |       |             |                          |
|---------|-------|-------------|--------------------------|
| GNMKV:  | PUSH  | PSW         |                          |
|         | PUSH  | B           |                          |
|         | STA   | GKV2 + 1    | ; STORE PARAMETER        |
|         |       |             | ; IN INSTRUCTION         |
|         | MVI   | B, 8H       | ; COUNT TO B REG         |
| GKV1:   | MOV   | A, M        | ; LOAD NTH BYTE          |
| GKV2:   | XRI   | OOH         | ; MAKE VARIANT X,        |
|         |       |             | ; X = 1 OR 2             |
|         | STAX  | D           | ; STORE NTH BYTE         |
|         | INX   | H           | ; INCR. FROM ADR.        |
|         | INX   | D           | ; INCR. TO ADDR.         |
|         | DCR   | B           | ; DECR. COUNT            |
|         | JNZ   | GKV1        | ;LOOP                    |
|         | POP   | B           | ;                        |
|         | POP   | PSW         | ;                        |
|         | RET   |             | ; RETURN                 |

```
; WORKING KEY LOAD ROUTINE
; KEY DECIPHERED USING MASTER
; KEY WHICH MUST BE PREVIOUSLY
; LOADED IN MASTER KEY REG.
; WORKING KEY LOADED INTO ACT.
; REGISTER AFTER DECIPHERING
; USES MOVE7
; LXI H, ADDR ADDRESS OF KEY
; CALL WKLOD
```

|         |       |                   |                          |
|---------|-------|-------------------|--------------------------|
| WKLOD:  | PUSH  | PSW               |                          |
|         | IN    | BPARAM + REDST    | ; CHECK STATUS           |
|         | ORA   | A                 | ; SET FLAGS              |
| WKER1:  | JNZ   | WKL4              | ; GO TO HALT             |
|         | CALL  | MOVE7             | ; MOVE FIRST 7 BTE       |
|         | OUT   | BPARAM + DECWK    | ; 8TH BYTE OUT           |
|         | LXI   | B, 500            | ; PROGRAMMED             |
| WKL1:   | CALL  | DELAY             | ; DELAY                  |
|         | NOP   |                   | ; > 320 MICROSEC.        |
|         | IN    | BPARAM + REDST    | ; CHECK STATUS           |
|         | ORA   | A                 | ; SET FLAGS              |
| WHER2:  | JM    | WKL2              | ; PARITY ERR. HALT       |
| WKWE3:  | JNZ   | WKL3              | ; TIME OUT HALT          |
|         | POP   | PSW               | ;                        |
|         | RET   |                   | ; RETURN                 |
| WKL2:   | HLT   |                   | ; PARITY ERR. HLT        |
| WKL3:   | HLT   |                   | ; TIME OUT HALT          |
| WKL4:   | HLT   |                   | ; BUSY HALT              |

```
                        ; ROUTINE FOR PROGRAMMED
                        ; DELAYS OF MORE THAN 255D
                        ; INSTRUCTION EXECUTION
                        ; TIMES SINCE A REG IS
                        ; ONLY 8 BITS
                        ; LXI B, COUNT > 255D
                        ; CALL DELAY
DELAY:   PUSH   PSW
         MOV    A, C                      ; TRANSFER THE
         ADI    00H                       ; PART OF COUNT
         JZ     DLY2                      ; LESS THAN
                                          ; 255D TO A RG
DLY1:    DCR    A                         ; DECR. A REG
         JNZ    DLY1                      ; < 255D LOOP
DLY2:    MVI    A, 254D                   ; SET UP 255 LOOP
DLY3:    DCR    A                         ; DECR. A
         JNZ    DLY3                      ; 255D LOOP
         DCR    B                         ; DECR. 255 LOOP
                                          ; COUNT
         JNZ    DLY2                      ; LOOP ANOTHER
                                          ; 255 TIMES
         POP    PSW
         RET                              ; RETURN
                        ; ROUTINE TO MOVE N BYTES
                        ; B REG = NO. OF BYTES
                        ; D&E = TO ADDRESS
                        ; H&L = FROM ADDRESS
                        ; MAXIMUM 256 BYTES
                        ; MVI B, NO.
                        ; LXI D, TO
                        ; LXI H, FROM
                        ; CALL MOVEN
MOVEN:   PUSH   PSW
MVN1:    MOV    A, M                      ; LOAD NTH BYTE
         STAX   D                         ; STORE NTH BYTE
         INX    D                         ; INCR. TO ADDR.
         INX    H                         ; INCR. FROM ADDR.
         DCR    B                         ; DECR. COUNT
         JNZ    MVN1                      ; LOOP
         POP    PSW                       ;
         RET                              ; RETURN
                        ; COMPARE 2 FIELDS SUBROUTINE
                        ; USED ONLY FOR DEBUGGING
                        ; NO. OF BYTES IN B REG.,
                        ; ADDRESS OF ONE FIELD IN H,
                        ; OTHER ADDRESS IN D
                        ; MVI B, N
                        ; LXI H, ADDR1
                        ; LXI D, ADDR2
                        ; CALL COMPR
                        ; IF FIELDS ARE NOT EQUAL,
                        ; ERROR HALT
COMPR:   PUSH   PSW
CMPR1:   LDAX   D                         ; ONE BYTE TO A
         CMP    M                         ; COMPARE ONE BYTE
CMPR2:   JNZ    CMPR3                     ; IF NOT ZERO, HLT
         INX    D                         ; INCR. D REG.
         INX    H                         ; INCR. H REG.
         DCR    B                         ; DECR. COUNT
         JNZ    CMPR1                     ; LOOP
         POP    PSW
         RET                              ; RETURN
CMPR3:   HLT                              ; FROM CMPR2, HALT,
                                          ; 2 FIELDS NOT
                                          ; EQUAL
                        ; ROUTINE TO DEBUG ALL OF
                        ; OTHER ROUTINES, SIMULATES
                        ; TERMINAL AND HPC. SENDS
                        ; AND RECEIVES ONE MESSAGE
                        ; AFTER GENERATING WK AND
                        ; EITHER TK OR SP1. FINAL
                        ; HALT AFTER TEST IS AT FINIS
                        ; ERROR HALTS OTHERWISE.
                        ; ROUTINE IS INITIATED AT
                        ; 'START' AND RUNS TO END.
                        ; USES SUBROUTINE COMPR TO
                        ; COMPARE RESULTS. ON NOT
                        ; COMPARE, ERROR HALT AT CMPR3.
START:   STKLN  200D                      ; SET STACK = 200
         LXI    SP, STACK                 ; INITIALIZE STACK
         NOP
         NOP
```

-continued

```
                NOP
                NOP
                OUT     BPARAM + RESET      ; INITIALIZE DSM
                MVI     A, 50               ; COUNT TO A REG.
DBUG1:          DCR     A                   ; DECR. A
                JNZ     DBUG1               ; LOOP - PROGRAMMED
                                            ; DELAY
                IN      BPARAM + REDST      ; READ STATUS
                ORA     A                   ; SET FLAGS
DBER1:          JM      DBUG4               ; PARITY ERROR
DBER2:          JNZ     DBUG5               ; TIME OUT OR NOT
                                            ; READY ERROR
                MVI     A, 5H               ; PARAM = TERMINAL
                LXI     H, ADRSP1           ; ADDR. OF FIRST OF
                                            ; 5 ADDRESS LIST
                                            ; TO H
                CALL    MROUT               ; DEBUG MAIN ROUT
                                            ; GENERATE WK &
                                            ; TK USING SP1
                                            ; KMT, & TID
                MVI     A, 3H               ; PARAM = WORK KEY
                                            ; ACTIVE
                LXI     H, DWK              ; ADDR GENERATED
                                            ; WK
                CALL    MWKLD               ; SET WK ACTIVE
                MVI     A, 5H               ; PARAM = ENCIPH.
                MVI     B, 4H               ; ENCIPH. 4 EIGHT
                                            ; BYTE GROUPS
                LXI     H, TMMSG            ; ADDR. PLAIN TEXT
                                            ; TRANS. REQ. MSG.
                LXI     D, TMEMSG           ; SPACE FOR ENCIPH
                                            ; TRANS. REQ. MSG.
                CALL    NGEDR               ; ENCIPH TRM
                ;                           ; USING WK
                ; FIRST PART OF ROUTINE AS IF
                ; FROM TERMINAL COMPLETE,
                ; CONTINUE TO HPC ROUTINE
                ;
                JMP     DEBUG2              ; CONTINUE
DBUG2:          MVI     A, 4H               ; PARAM = HPC
                LXI     H, HADSP1           ; ADDR. OF FIRST
                                            ; OF 5 ADDRESS
                                            ; LIST TO H
                CALL    MROUT               ; DEBUG REST OF
                                            ; MAIN ROUTINE
                                            ; GENER. WK & SP1
                                            ; USING TK, KMT, TID
                MVI     B, 8H               ; PARAM = LENGTH OF
                                            ; WK
                LXI     H, HPCWK            ; ADDR FIELD1
                LXI     D, DWK              ; ADDR FIELD2
                CALL    COMPR               ; COMPARE BOTH
                                            ; WK'S. HALT IF
                                            ; UNEQUAL.
                MVI     B, 8H               ; LENGTH OF SP1
                LXI     H, DSP1             ; ADDR FIELD 1
                LXI     D, HPSP1            ; ADDR FIELD 2
                CALL    COMPR               ; COMPARE BOTH
                                            ; SP1'S.
                MVI     A, 3H               ; PARAM = WORK KEY
                                            ; ACTIVE
                LXI     H, HPCWK            ; ADDR WK TO H
                CALL    MWKLD               ; SET WK ACTIVE
                MVI     A, 4H               ; PARAM = DECIPH.
                MVI     B, 4H               ; DECIPH. 4 EIGHT
                                            ; BYTE GROUPS
                LXI     H, TMEMSG           ; CIPHER TRANS.
                                            ; REQ. MSG.
                LXI     D, HPTRM            ; SPACE FOR PLAIN
                                            ; TEXT TRANS. REQ
                                            ; MSG.
                CALL    NGEDR               ; DECIPHER TRM
                MVI     B, 32               ; COUNT
                LXI     H, HPTRM            ; ADDR. FIELD 1
                LXI     D, TMMSG            ; ADDR FIELD 2
                CALL    COMPR               ; COMPARE TRM
                                            ; FROM TERMINAL
                                            ; AND FROM HPC.
                                            ; HALT ON ERROR
                MVI     A, 5H               ; PARAM = ENCIPH.
                MVI     B, 3H               ; ENCIPH. 3 EIGHT
                                            ; BYTE GROUPS
```

-continued

|  |  |  |  |
|---|---|---|---|
|  | LXI | H, HRESP | ; ADDR PLAIN TEXT |
|  |  |  | ; RESPONSE MSG. |
|  | LXI | D, HENCR | ; ADDR. LOCATION |
|  |  |  | ; OF CIPHER |
|  |  |  | ; RESPONSE MSG. |
|  | CALL | NGEDR | ; ENCIPH. RESPONSE |
|  |  |  | ; MSG. |
|  |  | ; | |
|  |  | ; END OF HPC DEBUG, CONTINUE | |
|  |  | ; TO FINAL TERMINAL DEBUG | |
|  |  | ; | |
|  | JMP | DBUG3 | ; CONTINUE |
| DBUG3: | MVI | A, 3H | ; PARAM = WORK KEY |
|  |  |  | ; ACTIVE |
|  | LXI | H, DWK | ; ADDR WK |
|  | CALL | MWKLD | ; SET WK ACTIVE |
|  | MVI | A, 4H | ; PARAM = DECIPH |
|  | MVI | B, 3H | ; DECIPH. 3 EIGHT |
|  |  |  | ; BYTE GROUPS |
|  | LXI | H, HENCR | ; CIPHER RESPONSE |
|  | LXI | D, DTMMS | ; SPACE FOR PLAIN |
|  |  |  | ; TEXT RESPONSE |
|  | CALL | NGEDR | ; DECIPHER RESP. |
|  | MVI | B, 24 | ; PARAM = RESPONSE |
|  |  |  | ; MSG. LENGTH |
|  | LXI | H, DTMMS | ; ADDR. FIELD 1 |
|  | LXI | D, HRESP | ; ADDR. FIELD 2 |
|  | CALL | COMPR | ; COMPARE 2 RES- |
|  |  |  | ; PONSE MSGS. |
| FINIS: | HLT |  | ; END OF ROUTINE |
|  |  |  | ; DEBUG COMPLETE |
| DBUG4: | HLT |  | ; PARITY ERROR |
|  |  |  | ; HALT, FROM DBER1 |
| DBUG5: | HLT |  | ; TIME OUT OR NOT |
|  |  |  | ; READY HALT, |
|  |  |  | ; FROM DBER2. |
|  | END | START | ; END, TO START. |
|  |  | ; PARAMETERS, LISTS, CONSTANTS | |
|  |  | ; | |
|  |  | ; | |
|  |  | ; | |
| BPARAM | EQU | 100H | ; DSM BEGIN PARAM. |
| MKEYL | EQU | 2H | ; MASTER KEY LOAD |
| WKEYL | EQU | 3H | ; WORKING KEY LOAD |
| DECDT | EQU | 4H | ; DECIPHER DATA |
| ENCDT | EQU | 5H | ; ENCIPHER DATA |
| DECWK | EQU | 6H | ; DECIPHER WORK. KEY |
| ENCWK | EQU | 7H | ; ENCIPHER WORK. KEY |
| RESET | EQU | 1H | ; RESET DSM |
| REDST | EQU | 2H | ; READ STATUS |
| TRMAK | EQU | 1H | ; TRANSFER MAJOR KEY |
| RDDAT | EQU | 4H | ; READ DATA |
| WRTDAT | EQU | 0H | ; WRITE DATA |
| WS1: | DS | 10 | ; WORK STORE ADDR. LIST |
| IADSP1 | EQU | WS1 | ; INDIR. ADDR. SP1 |
| IADTID | EQU | WS1 + 2 | ; INDIR. ADDR TID |
| IADKMT | EQU | WS1 + 4 | ; INDIR ADDR KMT |
| IADWK | EQU | WS1 + 6 | ; INDIR ADDR WK |
| IADTK | EQU | WS1 + 8 | ; INDIR ADDR TK |
| WS2: | DS | 120 | ; WORK STORE |
| SPARE | EQU | WS2 | ; SPARE LOCATION |
| KMT1 | EQU | WS2 + 8 | ; KMT1 LOCATION |
| KMT2 | EQU | WS2 + 16 | ; KMT2 LOCATION |
| TWK | EQU | WS2 + 24 | ; TEMP WK |
| TTK | EQU | WS2 + 32 | ; TEMP TK |
| SK | EQU | WS2 + 40 | ; SK LOCATION |
| DT1SK | EQU | WS2 + 48 | ; D/KMT1/(SK) |
| DT2SK | EQU | WS2 + 56 | ; D/KMT2/(SK) |
| SP2 | EQU | WS2 + 64 | ; SP2 LOCATION |
| SP3 | EQU | WS2 + 72 | ; SP3 LOCATION |
| TEMP1 | EQU | WS2 + 80 | ; TEMP LOCATION |
| TEMP2 | EQU | WS2 + 88 | ; TEMP LOCATION |
| TEMP3 | EQU | WS2 + 96 | ; TEMP LOC. |
| TEMP4 | EQU | WS2 + 104 | ; TEMP LOC. |
| MRPAR | EQU | WS2 + 112 | ; TEMP EN/DE PAR |
| KMT: | DB | 1301H | ; DUMMY KMT, BEFORE |
|  | DB | 1301H | ; DEBUGGING, MUST |
|  | DB | 1301H | ; BE MADE EQUAL TO |
|  | DB | 1301H | ; D/KMO/(EKMT) |
|  |  |  | ; THIS VALUE IS |
|  |  |  | ; USED FOR DEBUG. |
|  |  |  | ; AS IF FROM TERM. |

| | | -continued | |
|---|---|---|---|
| WS3: | DS | 6 | ; WORK STORE |
| NGPAR | EQU | WS3 | ; STORE EN/DE/ |
| | | | ; CIPHER PARAMET. |
| NGRPS | EQU | WS3 + 1 | ; STORE N GROUPS |
| NFROM | EQU | WS3 + 2 | ; STORE FROM ADR. |
| NTOAD | EQU | WS3 + 4 | ; STORE TO ADDR. |
| | ; FOR | DEBUGGING | ONLY |
| | ; | | |
| KMO: | DB | EFEFH | ; DUMMY |
| | DB | EFEFH | ; MASTER |
| | DB | EFEFH | ; KEY |
| | DB | EFEFH | ; |
| EKMT: | DB | EOEOH | ; DUMMY |
| | DB | EOEOH | ; ENCRYPTED |
| | DB | EOEOH | ; TERMINAL |
| | DB | EOEOH | ; KEY |
| DTID: | DB | 0101H | ; DUMMY |
| | DB | 0101H | ; |
| | DB | 0101H | ; TID |
| | DB | 0101H | ; |
| DWS: | DS | 16 | ; DEBUG LOCATIONS |
| DWK | EQU | DWS | ; DUMMY W:K LOC |
| DTK | EQU | DWS + 8 | ; DUMMY TK LOC |
| DSP1: | DB | 1010H | ; DUMMY |
| | DB | 1010H | ; SP1 |
| | DB | 1010H | ; PARAMETER |
| | DB | 1010H | ; |
| ADRSP1: | DW | DSP1 | ; ADDR OF SP1 |
| ADRTID: | DW | DTID | ; ADDR OF TID |
| ADRKMT: | DW | KMT | ; ADDR OF KMT |
| ADRWK: | DW | DWK | ; ADDR OF WK |
| ADRTK: | DW | DTK | ; ADDR OF TK |
| | | | ; THE ABOVE LIST IS |
| | | | ; USED FOR TERMIN. |
| | | | ; DEBUGGING |
| TMMSG: | DB | 'IMPORTAN' | ; TRANSACTION REQ. |
| | DB | 'T MESSAG' | ; MSG. USED AT |
| | DB | 'E to FOL' | ; TERM., WILL BE |
| | DB | 'LOW SOON' | ; ENCIPH. BY WK |
| DTMMS: | DB | 24 | ; AREA FOR ENCIPH. |
| | | | ; TRANS. REQ. MSG. |
| | | | ; RESPONSE FROM |
| | | | ; HPC AFTER DECIPH. |
| HPCWK: | DS | 8 | ; AREA IN WHICH TO |
| | | | ; STORE WK GENERATED |
| | | | ; AT DUMMY HPC, |
| | | | ; CHECK AGAINST DWK |
| HPSP1: | DS | 8 | ; AREA FOR SP1 |
| | | | ; FROM DUMMY HPC |
| | | | ; CHECK AGAINST DSP1 |
| HPTRM: | DS | 32 | ; AREA FOR DECIPH |
| | | | ; TRANS. REQ. MSG. |
| | | | ; FROM HPC, CHECK |
| | | | ; AGAINST TMMSG |
| HRESP: | DB | 'DISREGAR' | ; RESPONSE MSG., |
| | DB | 'D FIRST' | ; WILL BE ENCIPH. |
| | DB | 'MESSAGEX' | ; BY HPC USING WK |
| HENCR: | DS | 24 | ; AREA FOR ENCIPH |
| | | | ; RESPONSE MSG., |
| | | | ; USED AT HPC |
| HADSP1: | DW | HPSP1 | ; SP1 LOCATION |
| HADTID: | DW | DTID | ; TID LOC. |
| HADKMT: | DW | EKMT | ; ENCIPH. KMT LOC. |
| HADWK: | DW | HPCWK | ; HPC-WK LOC. |
| HADTK: | DW | DTK | ; TK LOC. |
| TMEMSG: | DS | 32 | ; AREA FOR ENCRYP- |
| | | | ; TED TRANS. REQ. |
| | | | ; MSG. FROM TERM. |

Summary

In the preferred example, an authorized holder of a size "A" magnetic-striped plastic card, which may be a Debit, Credit or Identification Card, would enter the card in a cash dispensing machine or automatic teller machine, enter his secret Personal Identification Number on a keyboard, and indicate the type and amount of transaction by pushing appropriate buttons provided for that purpose. The device would read the data on the magnetic stripe, such as account number and other data, and would also have available internally by electronic means a suitable Terminal Identification Code, a time clock and a secret Terminal Master Key. The device would generate, by appropriate means, a Transaction Request Message whose content would be determined by the type of transaction, amount requested and other data. In addition, the device would use part of the secret Personal Identification Number, part of the account number, part of the "Time" field, and part of a card anti-counterfeiting field if there is one, to generate a parameter that would be one input into a suitable encryption means. Additional inputs in a specified order or sequence would be the Terminal Master Key and the Terminal Identification. Multiple encryptions in a predetermined way would result in the generation of a Working Key, which would temporarily replace the Terminal Master Key within the encryption means and be used to encipher the Transaction Request Message and other data that may be required. The Working Key is then multiply-enciphered in a predetermined way using the Terminal Master Key and Terminal Identification to generate the Transmitted Key which is appended to the enciphered Transaction Request Message together with any additional data required to process the transaction such as routing, transit and other control information, and/or an Initialization Vector that may be required to initialize or synchronize the deciphering means. A link encryption key may then be used to encipher all of the data to be transmitted to protect the network against "traffic analysis" intrusion by wire tap. The Transaction Request Message and header and control data are transmitted to the centralized computer, which may require intermediate receivers and transmitters (nodes) in a large network. At some nodes, decipherment using the link encryption key may be required, with subsequent encipherment using a different link encryption key appropriate for the next segment of the transmission. At the centralized computer, the message is first deciphered using the last-used link encryption key. Then the other data in the header or control part of the message and data available in the centralized data base, some of which may be enciphered, are used to multiply-decipher the Transmitted Key, preferably in a physically and electronically separate and secure device sometimes called a Network Security Controller (NSC) or a Security Module (SM), which process of decipherment results in generation of the Working Key that was used to encipher the Transaction Request Message at the terminal. The Working Key is used to decipher the Transaction Request Message and is then additionally multiply-decrypted to obtain the parameter that was used at the terminal to initiate the process. Since that parameter contains part of the secret Personal Identification Number, part of the account number and part of the card anti-counterfeiting features, if there is one, the validity of the transaction can be determined by comparison of the fields in the message with the corresponding fields of data obtained from the centralized data base, for which comparison additional encipherments and/or decipherments may be required. Specifically, the account number in the message may be used to obtain the corresponding secret Personal Identification Number and the card anti-counterfeiting number if there is one from the centralized data base which are compared with the corresponding partial fields that were, by implication, included in the message at the terminal. In the preferred embodiment, the secret Personal Identification Number is not otherwise directly included in the Transaction Request Message, it is independently generated at the centralized computer by decipherments in a predetermined way, so that a penetrator somehow obtaining a deciphered message still does not have access to any data that will permit compromise of that account or any other account or aspect of system operation. The card anti-counterfeiting number, if there is one, also need not be included in the Transaction Request Message provided it is used at the terminal to generate the parameter that enters into the first encipherment. Since the multiple encipherments at the terminal also include the Terminal Identification and the secret Terminal Master Key, it is not possible for a penetrator to substitute a spurious terminal in the network for the purpose of initiating fraudulent transactions to transfer funds. In the preferred embodiment, part of the "Time" field is included in the parameter that is enciphered at the terminal, to insure that each Transaction Request Message is enciphered using a different Working Key.

At the centralized computer, after the Transaction Request Message is validated, as described, additional processing may be required to determine if the transaction should be approved by determining if the account balance is adequate, if the transaction requested is valid for the specific account, if the plastic card used to initiate the transaction is not out-of-date, lost or stolen and by other processing that may be required. In the present example, the transaction is approved, the centralized computer generates an appropriate response which is enciphered within the NSC or SM using the same Working Key and transmitted to the terminal that initiated the transaction, from node to node, as may be required, and with link encryption as may be required. The terminal deciphers the response and provides the requested service by dispensing the amount of cash requested. The terminal generates an acknowledgement that may include the type of service provided and amount, encrypts it using the same Working Key that was used for the Transaction Request Message, and transmits it to the centralized computer. After the centralized computer receives the acknowledgement, it changes the accounting data base to reflect the results of the transaction, then the terminal and the centralized computer destroy the Working Key securely by resetting the register or location in which the Working Key was stored, and the transaction is complete. The transaction need not be to dispense cash, it may be to transfer funds, accept a deposit, make an advance to a valid credit card or against a reserve account or may be other types of transactions that may be provided by the Financial Institution for its depositors.

A secret Terminal Master Key is required to be securely stored at each terminal, computer or other device that may initiate a message. In the preferred embodiment, the Terminal Master Key is never transmitted in any form but distributed by armed guard and entered under dual control into the encipherment means at each terminal, computer or other device, or other similar means are used that provides a similar level of security. Other systems that use encipherment also require manual entry of at least one secret key for proper operation. However, all other systems require more than 1 additional key be also entered or received at each terminal, some of which may be transmitted enciphered and are then deciphered in the terminal before use. In at least one system, the enciphering key that was used at the centralized computer to encipher all the secret Personal Identification Numbers, Key A, must be entered into each terminal in the network, which may number hundreds or more, thereby increasing the possibility of compromise. The Key A is distributed as Key $A^1$ and manipulated internally in the terminal to form Key A, to reduce the possibility of compromise; nonetheless, such wide distribution still represents an exposure. In addition, a communications key is required at each terminal. In my invention, only one encryption key is required at each terminal, the Terminal Master Key or equivalent, thereby eliminating the exposure of the enciphering key that was used to encipher all the secret Personal Identification Numbers in the account data base. Furthermore, instead of only one key, Key A, being used to encipher all the secret Personal Identification Numbers in an account data base, multiple keys may be so used, reducing the intrinsic value of each such key considering bribery, coercion or blackmail, and facilitating plastic card reissue due to a change of equipment, change of technology, compromise of one or more enciphering keys, due to elapsed time, or for other reasons. In addition, using one key, Key A, may be adequate in a proprietary network, but does not facilitate sharing, or interchange of transactions between Financial Institutions. My invention provides for sharing and interchange.

In some networks, computer-to-computer messages are required for administrative purposes. My invention provides for such messages provided there is an analogue for the secret Personal Identification Number, such as a "Password," and analogues for the Terminal Master Key and for the Terminal Identification, as already described.

Yet other systems require that a terminal that is to communicate with a centralized computer must first send a message to a Network Security Controller (NSC) validating itself and requesting a Working Key or Communications Key. The NSC generates 2 copies of one key and transmits one enciphered copy to the terminal and one enciphered copy to the centralized computer. The terminal deciphers the Working Key, uses it to encipher the message and transmits it to the centralized computer, where it may be deciphered. Multiple transmissions are required for each transaction in that system, decreasing effective utilization of costly data communications lines. My invention does not require the additional transmissions since authentication of the terminal and generation of the Working Key are integral to the operation of the system.

Because the method of using the Terminal Master Key in my invention protects it from exposure or compromise by cryptanalysis, it may be used for an extended period if not otherwise compromised. As a result, it is possible to use this invention in networks in which it would be difficult or impossible to permit changing a set of Master Keys on a frequent basis due to inaccessibility. One such network is one in which a communications satellite is used as a switching center. For example, a small number of transmitters may each have a need to transmit data to a large number of receivers in a way that does not permit other transmitters or some of the receivers to obtain access to the data transmitted. It would be an inefficient use of communications to require each transmitter or the satellite to maintain a separate enciphering key for each receiver and to separately encipher and process multiple copies of the same message, each originally enciphered using a different key. It is more efficient to permit the transmitter to encipher only one copy of a message and supply a list of recipients to the satellite, thereby permitting the satellite to decipher the message, and then to separately generate a Working Key to encipher one copy for each receiver using a different Master Key or set of Master Keys for each Working Key. The Master Keys could be combined 2, 3, 4 ... (n−1) at a time by "exclusive or" to minimize the storage requirements, especially if there are a large number of receivers. The same methods as already described can be used provided each transmitter and receiver has a secret password, an Identification and a secret Master Key, and a means for encryption and decryption.

In the preferred embodiment described, the National Bureau of Standards Data Encryption Standard was used to clarify the description and explanation of the invention, which standard may be used in Electronic Code Book Mode, Cipher Feed Back Mode or Block Chaining Mode. Those skilled in the art will recognize that other cryptographic means or systems which require or permit a secret encryption key are as suitable, and that the use of 56 binary digit or 64 binary digit enciphering keys, and 64 binary digit blocks of plain text and cipher text are for illustrative purposes only and do not limit the scope of the invention. The method described can as well be implemented in software using a large scale computer, a minicomputer or a microcomputer, or in hardware using a large scale integrated circuit device designed and manufactured for the purpose or by other electronic devices. Instead of a "Time" field indicated previously, a currency counter, a transaction serial number or any other parameter that changes with each transaction can be used without changing or limiting the scope of the invention.

Although not a preferred embodiment, another variation in operation is feasible in some networks. In some networks it may be possible to include the PAN and TID as a header in the link encrypted part of the message. The PAN can be used at the centralized computer to retrieve the encrypted PIN from the data base after the Security Module decrypts the header using the last-used link encryption key. The Security Module decrypts the PIN and uses the PAN and the PIN to form SP1 and, by the method already described, generates the WK using the TID, KMT and its variants. The Security Module then decrypts the Transaction Request Message and may verify the PIN if it was encrypted with the Transaction Request Message. Alternatively, if the message decrypts properly using the WK, the correct PIN was used to initiate the transaction at the terminal by implication. If all this is done, it is not necessary to generate or transmit TK.

Although a particular embodiment of a system for authenticating users and devices in on-line transaction networks in accordance with the invention has been described for the purpose of illustrating the manner in which the invention may be used to advantage, it will be appreciated that the invention is not limited thereto. Accordingly, any modification, variation or equivalent arrangement within the scope of the accompanying claims should be considered to be within the scope of the invention.

I claim:

1. In a system for authenticating users and devices in on-line transaction networks comprising a plurality of remote terminals in communication with a central processing unit including a data base containing encrypted data used in the authentication of the users and devices, said data being encrypted with a master key and including terminal master keys for each of said remote terminals and identification numbers for each of said users all of which are secret, said data further including terminal identification numbers for each of said remote terminals and account numbers for each of said users, wherein each of said remote terminals is provided with means for entering an account number and an identification number of a user initiating a transaction as well as the nature of the transaction, the improvement in a method for protecting the transaction comprising the steps of:

generating at a terminal a transaction request message based on the information entered at the terminal by a user initiating a transaction, using the identification number and the account number entered by the user and the terminal identification number and the terminal master key, and employing such variants as to generate a working key unique to each transaction, encrypting the transaction request message using the working key, transmitting the encrypted transaction request message, deriving the working key at the central processing unit using information derived from the transmitted message and the data base including the account number, the terminal master key and the terminal identification number, decrypting the message received at the central processing unit using the working key, comparing the user identification number and account number obtained by decrypting corresponding data in the data base with the data in the transaction request message to validate the transaction request message, generating a transaction request response and encrypting the transaction request response with the working key, transmitting the encrypted transaction request response to the terminal where the transaction was initiated, and decrypting the message received at the terminal using the working key and, if the transaction is approved, providing the requested service.

2. The method of protecting a transaction as recited in claim 1, further comprising the step of appending the account number to the encrypted transaction request message prior to transmitting and wherein the step of deriving the working key is performed by generating the working key using the appended account number, the user identification number, the terminal identification number and the terminal master key.

3. The method of protecting a transaction as recited in claim 1, further comprising the steps of generating a transmitted key using the working key and appending the transmitted key to the encrypted transaction request message prior to transmitting and wherein the step of decrypting the message is performed using the appended transmitted key to obtain the working key, the working key then being decrypted to obtain the user identification number.

4. The method of protecting a transaction as recited in claim 3, further comprising the steps of:

after decrypting the message received at the terminal, generating and transmitting an acknowledgement to the central processing unit, and destroying the working key at the terminal and the central processing unit after acknowledgement.

5. The method of protecting a transaction as recited in claim 4, wherein said acknowledgement is encrypted using the working key.

6. The method of protecting a transaction as recited in claim 3, wherein the step of generating the working key comprises the steps of:

using the user identification number and account number entered at the terminal, generating a first security parameter, generating a secondary key by encoding the terminal identification number using the terminal master key, and using the first security parameter and the secondary key to generate the working key.

7. The method of protecting a transaction as recited in claims 3 or 6, wherein the time of day is also used to generate the working key.

8. The method of protecting a transaction as recited in claim 6, wherein the time of day is used to generate the first security parameter and at the central processing unit, further comprising the step of decrypting the first security parameter using the working key to obtain the time of day, the transaction not being approved if the decrypted time of day varies by more than a predetermined time period from the time of day at the central processing unit.

9. The method of protecting a transaction recited in claim 4, further comprising the step of updating the data base at the central processing unit after acknowledgement.

10. The method of protecting a transaction as recited in claim 3, wherein each of said terminals includes a card reader for reading a user card encoded with the user account number, the card being inserted in the card reader in order to initiate a transaction and the user then entering a user identification number.

11. The method of protecting a transaction as recited in claim 10, wherein the card encoded with the user account number also has an anti-counterfeiting feature, and the step of generating a working key comprises the steps of:

using the user account number and identification number, the anti-counterfeiting feature and the time of day, generating a first security parameter, generating a secondary key by encoding the terminal identification number using the terminal master key, and using the first security parameter and the secondary key to generate the working key.

12. The method of protecting a transaction as recited in claim 6, wherein the step of generating the working key further comprises the steps of:

using the first security parameter and the secondary key, generating a second security parameter, and using the second security parameter and the secondary key to generate the working key.

13. The method of protecting a transaction as recited in claim 12, wherein the step of generating the transmitted key comprises the steps of:

generating a third security parameter using the working key and the secondary key, and generating the transmitted key using the third security parameter and the secondary key.

14. The method of protecting a transaction as recited in claim 13, wherein the step of decrypting the message received at the central processing unit comprises the steps of:

multiply decrypting the transmitted key to first obtain the third security parameter and then the working key, and decrypting the transaction request message using the decrypted working key.

15. The method of protecting a transaction as recited in claim 10, wherein after the step of comparing the user identification number and account number, if the transaction is not validated, comprising the further step of requesting that the user identification number be re-entered to re-initiate the transaction.

16. The method of protecting a transaction as recited in claim 15, wherein the card is retained in the card reader and not returned to the user if the step of requesting the user identification to be re-entered is repeated a predetermined number of times.

17. The method of protecting a transaction as recited in claim 3, wherein the on-line transaction networks comprise a plurality of central processing units each in communication with other central processing units, each of said central processing units having an identification number which is used to obtain a secret interchange master key and a secret password, further comprising the steps in an interchange transaction between central processing units of:

using the interchange master key and the password to generate an interchange working key, encrypting the terminal identification number and the terminal master key using the interchange working key to generate an interchange transmitted key and appending the interchange transmitted key to the encrypted transaction request message, and transmitting the encrypted transaction request message with the appended interchange transmitted key to a second central processing unit.

* * * * *

UNITED STATES PATENT AND TRADEMARK OFFICE
CERTIFICATE OF CORRECTION

PATENT NO. : 4,317,957

DATED : March 2, 1982

INVENTOR(S) : Marvin Sendrow

It is certified that error appears in the above-identified patent and that said Letters Patent is hereby corrected as shown below:

Column 12, line 49, "Passwork" should read -- Password --.

Column 13, line 40, "response to acknowledgment" should read -- response or acknowledgment --.

Table 2, bridging Columns 7 and 8, "KM2 to KR" should read -- KM2 in KR --.

Bridging Columns 19 and 20, line 37, across from "SHLD IADTK": "STORE INDIR. TK" should read -- ; STORE INDIR. TK --.

Bridging Columns 19 and 20, line 45, across from "MVI A,3H"; ";PARAMETER TO LHLD" should read -- ; PARAMETER TO A --.

Bridging Columns 39 and 40, line 37: "E to FOL" should read -- E TO FOL --.

UNITED STATES PATENT AND TRADEMARK OFFICE
CERTIFICATE OF CORRECTION

PATENT NO. : 4,317,957

DATED : March 2, 1982

INVENTOR(S) : Marvin Sendrow

It is certified that error appears in the above-identified patent and that said Letters Patent is hereby corrected as shown below:

Bridging Columns 39 and 40, line 55:

":D FIRST' should read --   'D FIRST'   --.

Signed and Sealed this

Twenty-first Day of December 1982

[SEAL]

Attest:

Attesting Officer

GERALD J. MOSSINGHOFF

Commissioner of Patents and Trademarks